US012065841B1

(12) United States Patent
Walsh et al.

(10) Patent No.: US 12,065,841 B1
(45) Date of Patent: Aug. 20, 2024

(54) PROCESS AND SYSTEM FOR INSTALLING REPLACEMENT DOOR

(71) Applicant: Masonite Corporation, Tampa, FL (US)

(72) Inventors: Jason M. Walsh, Batavia, IL (US); Patrick C. Ege, Westmont, IL (US); Robert C. Allen, Elburn, IL (US); Poormehr Honarmand, Wellesley, MA (US); William W. Kling, Lombard, IL (US)

(73) Assignee: MASONITE CORPORATION, Tampa, FL (US)

( * ) Notice: Subject to any disclaimer, the term of this patent is extended or adjusted under 35 U.S.C. 154(b) by 176 days.

(21) Appl. No.: 17/690,724

(22) Filed: Mar. 9, 2022

Related U.S. Application Data

(60) Provisional application No. 63/164,153, filed on Mar. 22, 2021, provisional application No. 63/159,037, filed on Mar. 10, 2021.

(51) Int. Cl.
*E05D 11/00* (2006.01)
*E04F 21/00* (2006.01)

(52) U.S. Cl.
CPC ...... *E04F 21/0023* (2013.01); *E05D 11/0009* (2013.01)

(58) Field of Classification Search
CPC ......................... E05D 11/0009; E04F 21/0023
See application file for complete search history.

(56) References Cited

U.S. PATENT DOCUMENTS

| | | | |
|---|---|---|---|
| 1,446,309 A | 2/1923 | Krohne | |
| 1,715,722 A | 6/1929 | Smith et al. | |
| 2,621,687 A | 12/1952 | Fordon | |
| 3,871,054 A | 3/1975 | Schaefer | |
| 4,010,931 A | 3/1977 | Wheeler | |
| 4,168,827 A | 9/1979 | Hutchinson | |
| 4,270,741 A | 6/1981 | Hurst | |
| 4,492,369 A | 1/1985 | Pohl | |
| 5,927,731 A | 7/1999 | Clarke | |
| 6,024,351 A | 2/2000 | Metoyer | |
| 6,505,844 B2 | 1/2003 | Hallman et al. | |
| 6,886,821 B2 | 5/2005 | Eberle, III | |
| 7,806,394 B2 * | 10/2010 | Wuerthner | E04F 21/0023 269/254 R |
| 8,220,780 B2 | 7/2012 | Guillore et al. | |

(Continued)

*Primary Examiner* — Daniel J Troy
*Assistant Examiner* — Daniel Alvarez
(74) *Attorney, Agent, or Firm* — CANTOR COLBURN LLP

(57) ABSTRACT

A system for installing a door slab in a door frame. The system comprises an adaptable door mounting support configured to acquire a door gap and to support the door slab at a height off of the ground equal to the door gap. The door mounting support includes a frame member and at least one tie device provided to meter the door gap and hold the door slab in place off the ground at the height equal to the door gap. The frame member includes two A-shaped segments interconnected by a bottom section and together defining a door support channel therebetween. The at least tie device includes a cable tie extending across the door support channel and a locking tab attached to the cable tie by sliding the locking tab over the cable tie. The locking tab is lockable on the cable tie.

4 Claims, 31 Drawing Sheets

(56) References Cited

U.S. PATENT DOCUMENTS

| | | | |
|---|---|---|---|
| 8,757,604 B2 | 6/2014 | Crampton | |
| 8,910,389 B1 * | 12/2014 | Kamar ................ | E04F 21/0015<br>33/197 |
| 9,586,309 B1 | 3/2017 | Poulos et al. | |
| 10,005,173 B2 | 6/2018 | Furey | |
| 2002/0125625 A1 | 9/2002 | Klippel | |
| 2015/0020461 A1 | 1/2015 | Galvez | |
| 2019/0284822 A1 | 9/2019 | Hayes | |

* cited by examiner

PROCESS AND SYSTEM FOR INSTALLING REPLACEMENT DOOR

CROSS-REFERENCE TO RELATED APPLICATION AND CLAIM TO PRIORITY

This application claims the benefit of U.S. Provisional Patent Application Ser. No. 63/159,037 filed Mar. 10, 2021 by Allen et al., and Ser. No. 63/282,975 filed Nov. 24, 2021 by Ege et al., which are hereby incorporated herein by reference in their entirety and to which priority is claimed.

BACKGROUND OF THE INVENTION

1. Field of the Invention

The present invention is related to methods and a system for changing doors, and more specifically to a process and system for installing and quickly changing replacement doors.

2. Description of the Related Art

Existing exterior or interior doors are found everywhere for opening and closing access between two rooms or zones. Occasionally a door or doors may need to be replaced and installed in the frame that previously held the door being replaced.

Currently it is quite difficult to replace a door. Door replacement is a job that one of average do it yourself ("DIY") skills may not have the confidence to tackle. Currently there are essentially two options: one being the use of a "pre-hung" door unit (i.e., including a pre-hinged door slab that is already fastened to a prebuilt door frame), and the other option being replacement by using a skilled installer, such as a carpenter, to install and adjust the door slab while leaving the door frame in place.

Replacing the door slab with a pre-hung door requires the installer to remove the entire existing (or old) door slab and frame from an opening in a wall, and re-installing a replacement door slab and frame into the opening. This requires a higher level of DIY skill and knowledge. It can take a considerable amount of time and effort if one is not skilled in the procedure, in addition to having the necessary tools.

Installing the replacement door slab presents its own unique challenges and is generally more difficult than installing a pre-hung door system, especially for one with no prior experience. For example, during the installation the installer typically needs to lift the replacement door slab into place, which can be awkward and difficult without two people, and then fasten the door to the frame. Moreover, the replacement door slab needs to be placed and supported at the same door gap as the existing door slab to facilitate installation of the replacement door slab to the door frame. Typical supports are cumbersome and require many adjustments. Also, door hinges have to be accurately mounted to a door slab in order to assure the door swings properly within the pre-existing frame. Adjustment frequently is necessary. Moreover, it is important to correctly locate and mark positions of hinge screw holes on door frames and the door to be hung. The accurate location of hinge components on door slabs is often time consuming and requires taking repeated measurements to ensure accurate alignment. Various types of devices have been developed as aids to help carpenters and home handymen to place precisely hinges on all types of doors.

Therefore, the need exists for a process and system for installing replacement interior doors, which is more accessible and easier relative to the current "state of the art", and which enables someone with average DIY skills to accurately and quickly replace a door slab (as opposed to the door slab and door frame) with a minimum number of tools.

BRIEF SUMMARY OF THE INVENTION

According to a first aspect of the present invention, there is provided a system for installing a door slab in a door frame. The door slab is adapted to be pivotally mounted to the door frame by door hinges. The system comprises an adaptable door mounting support configured to acquire a door gap, defined as a distance between a bottom edge of the door slab pivotally mounted to the door frame through the door hinges and the ground/floor and to support the replacement door slab at a height off the ground equal to the door gap. The door mounting support includes a frame member and at least one tie device. The at least one tie device meters the door gap and holds the door slab in place at the height off the ground equal to the door gap. The frame member includes first and second A-shaped segments interconnected by a bottom section and together defining a door support channel therebetween adapted to receive a portion of the door slab therein. The at least one tie device includes a cable tie extending across the door support channel and a locking tab attached to the cable tie by sliding the locking tab over the cable tie. The locking tab is lockable on the cable tie to adjust the distance between the cable tie and the bottom section of the frame member.

According to a second aspect of the present invention, there is provided a process for installing a replacement door slab in a door frame by door hinges instead of an existing door slab. The process comprises the steps of: providing a door mounting support including a frame member and at least one tie device, wherein the frame member includes first and second A-shaped segments interconnected by a bottom section and together defining a door support channel therebetween adapted to receive a portion of the door slab therein, the at least one tie device includes a cable tie extending across the door support channel and a locking tab attached to the cable tie by sliding the locking tab over the cable tie, positioning the door mounting support under a bottom edge of the existing door slab hung on the door frame so that the bottom edge of the existing door slab is disposed in the door support channel of the door mounting support above the cable tie of the at least tie device, acquiring a door gap defined as a distance between the bottom edge of the existing door slab and a floor by pulling the cable tie so that a portion of cable tie is raised to touch the bottom edge of the existing door slab, locking the cable tie in place by pushing the locking tab down toward one of the A-shaped segments, removing the existing door slab from the door frame and from the door mounting support, placing the replacement door slab on the cable tie in the door support channel of the door mounting support, and securing the replacement door slab to the door frame by the door hinges.

Other aspects of the invention, including system, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
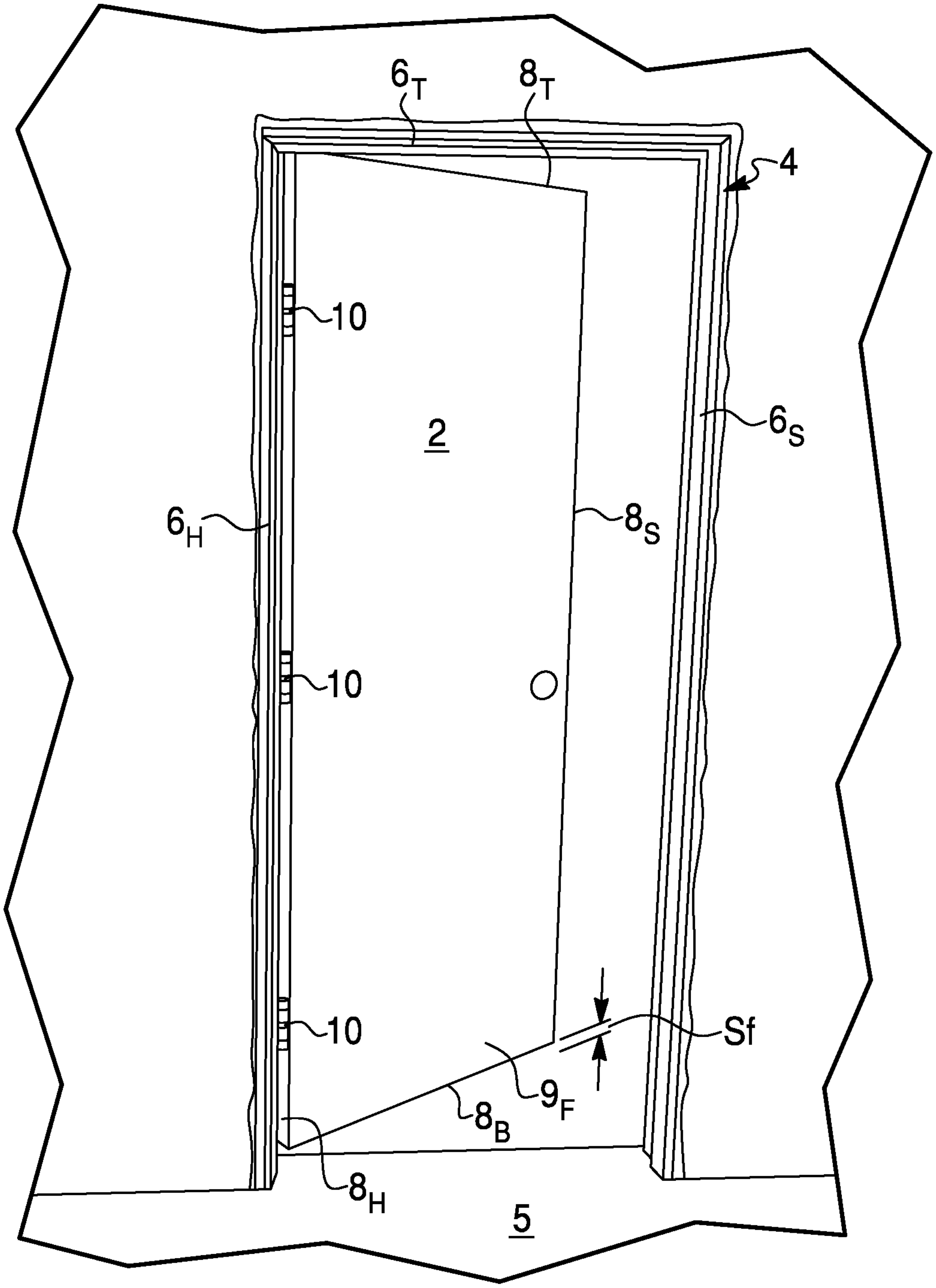
FIG. 1 is a perspective view of a door slab mounted onto a door frame.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

The present invention is directed to a process and system for quickly installing a replacement door that allows an installer with only DIY experience to easily and accurately install a new door slab into an existing frame with a minimum number of tools. The installation process of the present invention is backed up with guided instructions (digital or paper) that walk the installer through each and every step to assure a successful installation. Thus, the present invention is directed to a process and system for assisting with consistent and accurate installation of a horizontally swinging replacement (or new) door slab 2 of any preferred type to be mounted to a door frame 4 by means of a plurality of vertically spaced easy install replacement (or retrofit) door hinges 10, as illustrated in FIGS. 1 and 2A-2D, for homeowners who want to change out their doors to a new door style or where a new door is required for other reasons. The door frame 4 includes a hinge jamb $\mathbf{6}_H$, a strike jamb $\mathbf{6}_S$, and a top rail or header $\mathbf{6}_T$ connecting the hinge jamb $\mathbf{6}_H$ and the strike jamb $\mathbf{6}_S$ at the top of the door frame 4. Similarly, the replacement door slab 2 includes a hinge side (or surface) $\mathbf{8}_H$, a top side $\mathbf{8}_T$, a strike side $\mathbf{8}_S$ opposite the hinge side $\mathbf{8}_H$, and a bottom side $\mathbf{8}_B$. Moreover, the replacement door slab 2 includes a front face (or surface) $\mathbf{9}_F$ and an opposite rear face (or surface) $\mathbf{9}_R$. The replacement door slab 2 is to be attached to the door frame 4 by the replacement door hinges 10 that are typically screwed into the door frame 4.

Figure 2A:
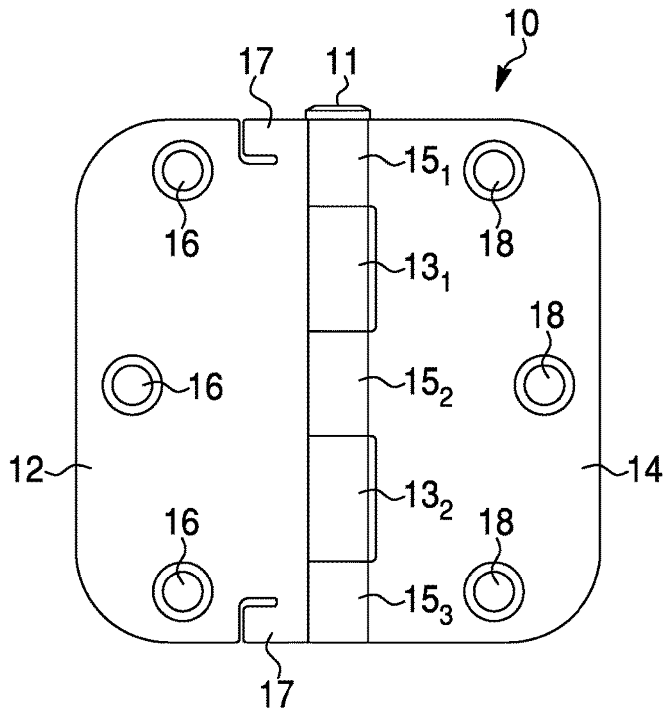
FIG. 2A is a top view of an easy install door hinge according to an exemplary embodiment of the present invention in an open position.
Figure 2D:
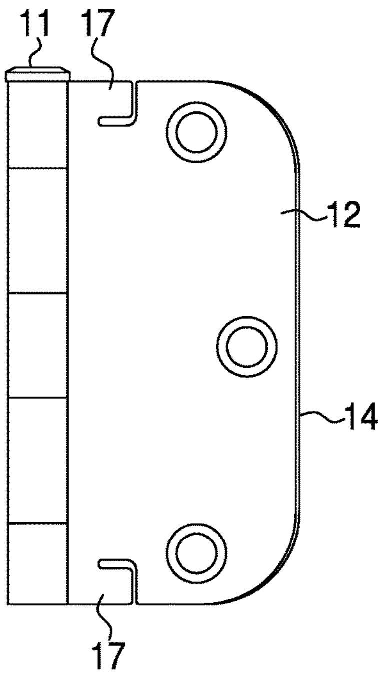
FIG. 2D is a top view of the easy install door hinge in the closed position.
Figure 2B:
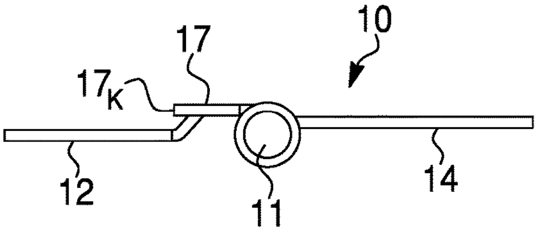
FIG. 2B is a side view of the easy install door hinge in the open position.

As best shown in FIGS. 2A-2D, the replacement door hinge 10 includes a door hinge leaf 12 adapted to be secured to the hinge side $\mathbf{8}_H$ of the door slab 2, and a frame hinge leaf 14 adapted to be secured to the hinge jamb $\mathbf{6}_H$ of the door frame 4. The hinge leaves 12, 14 are pivotally coupled by a hinge pin (or pintle) 11. The hinge leaves 12 and 14 are provided with axially aligned interfitting hinge knuckles $\mathbf{13}_1$, $\mathbf{13}_2$ and $\mathbf{15}_1$, $\mathbf{15}_2$, $\mathbf{15}_3$, respectively. Each of the interfitting hinge knuckles $\mathbf{13}_1$, $\mathbf{13}_2$ and $\mathbf{15}_1$, $\mathbf{15}_2$, $\mathbf{15}_3$ has a substantially uniform internal diameter to slidably receive the hinge pin (or pintle) 11. The door hinge leaf 12 is configured to be attached to the hinge side $\mathbf{8}_H$ of the replacement door slab 2, while the frame hinge leaf 14 is configured to be attached to the hinge jamb $\mathbf{6}_H$ of the door frame 4. The door hinge leaf 12 has a plurality of hinge screw bores 16 for receiving screws to securely fasten the door hinge leaf 12 to the door slab 2, while the frame hinge leaf 14 has a plurality of hinge screw bores 18 for receiving screws to securely fasten the frame hinge leaf 14 to the hinge jamb $\mathbf{6}_H$ of the door frame 4. Alternatively, one of the hinge screw bores 16 of the door hinge leaf 12 may be oval, allowing for adjustment of the door hinge leaf 12 or the hinge screw when fixing the door hinge leaf 12 on the door slab 2. The door hinge leaf 12 of the retrofit hinge 10 is to be attached to an adjacent vertical edge (i.e., the hinge side $\mathbf{8}_H$) of the swinging door slab 2 by screws received through the hinge screw bores 16 in the door hinge leaf 12. Similarly, screws attach the frame hinge leaf 14 to an opposing edge of the hinge jamb $\mathbf{6}_H$ of the fixed door frame 4. The frame hinge leaf 14 is slightly longer than the door hinge leaf 12, as best shown in FIG. 2D. This is done to allow the door slab 2 to shut fully.

As best shown in FIGS. 2A-2D, the door hinge leaf 12 has one or two hinge tabs (or cutouts) 17 that help to locate the replacement door hinge 10 on the door slab 2, ensuring a proper hinge backset. Each of the hinge tabs 17 is offset from a flat surface of the door hinge leaf 12 and has an engaging edge 17*k* provided to engage a rear side (or surface) $\mathbf{9}_R$ of the door slab 2. The replacement door hinge 10 also has a smaller amount of swage St, i.e., a gap between the door hinge leaf 12 and the frame hinge leaf 14, when the replacement door hinge 10 is in the closed position (shown in FIG. 2C) which allows the replacement door hinge 10 to be used with a door having the same door width as the door being replaced.

Figure 2C:
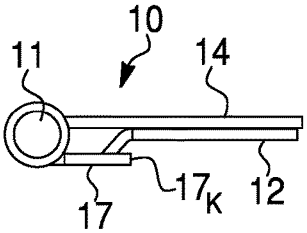
FIG. 2C is a side view of the easy install door hinge in a closed position.
Figure 3A:
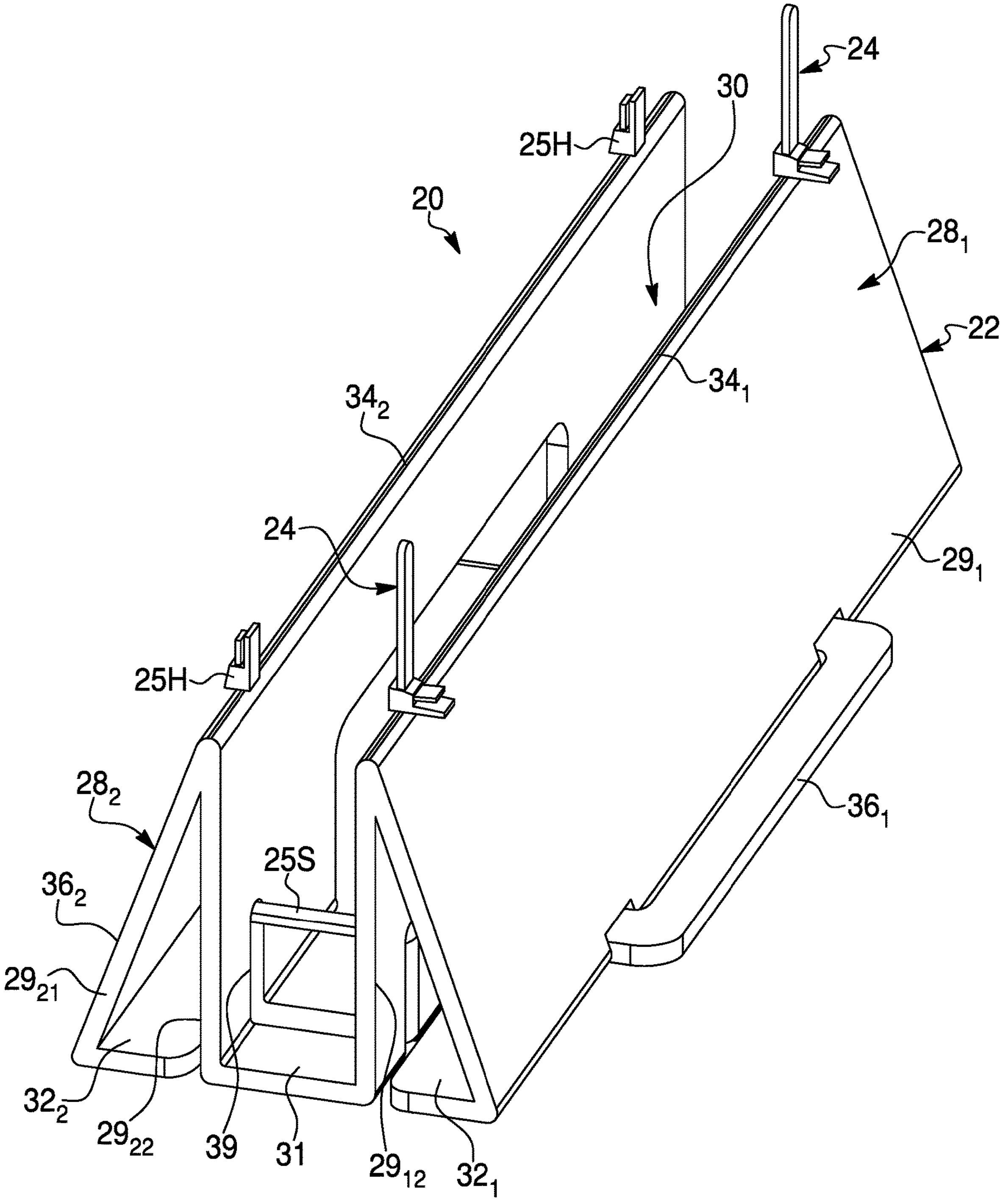
FIG. 3A is a perspective view of a door mounting support according to an exemplary embodiment of the present invention from a first side.
Figure 3B:
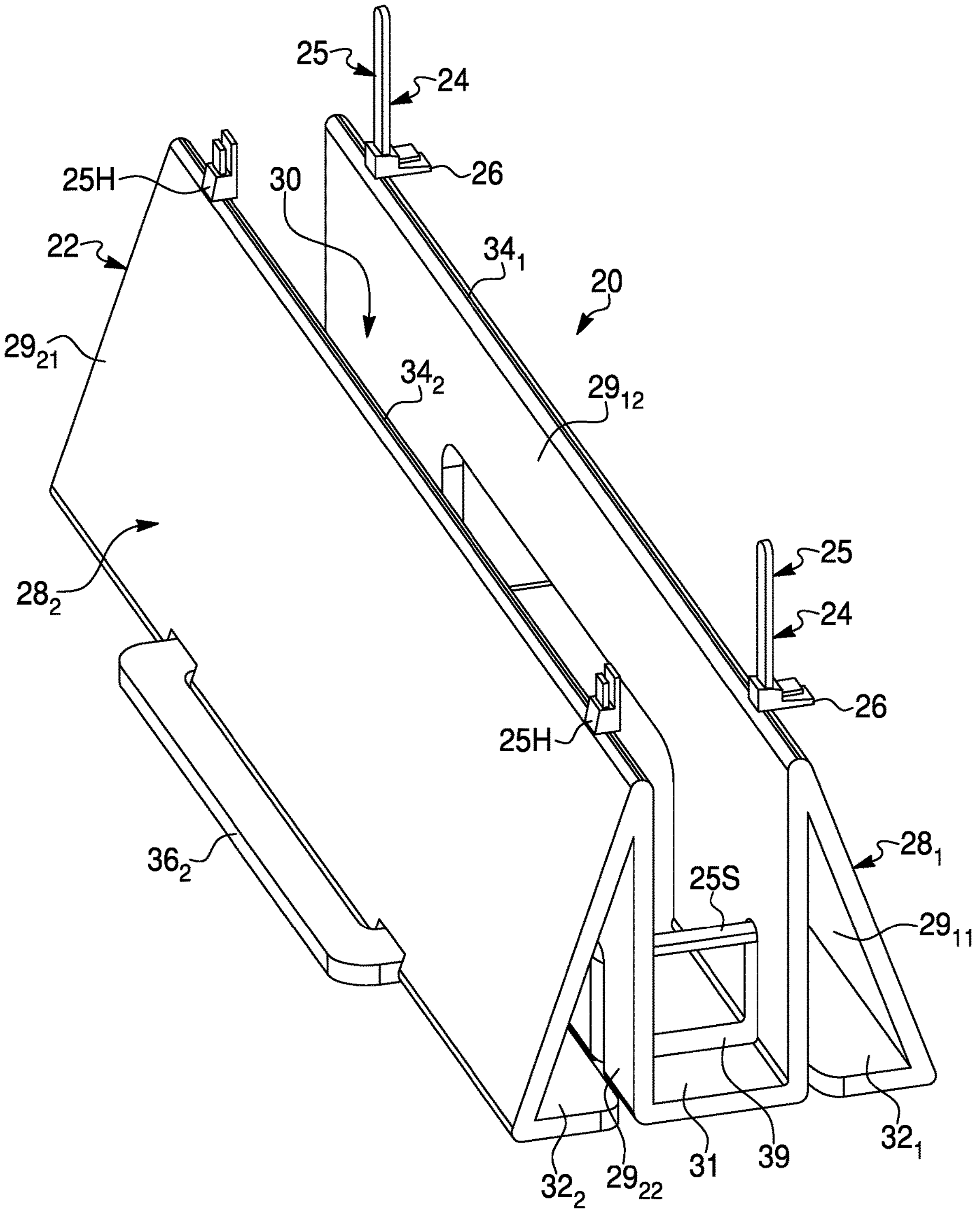
FIG. 3B is a perspective view of the door mounting support according to the exemplary embodiment of the present invention from a second side.

The retrofit door hinge 10 is designed to be flush mounted to the door slab 2 and still provide adequate clearance so the door slab 2 can fully shut. This is accomplished because the door hinge leaf 12 is bent (or offset) in such a way as to allow the hinge leaves 12, 14 to come together flush with one another, as best shown in FIG. 2C. Additionally, the thickness of the hinge material is optimized to accommodate flush mounting while maintaining clearance so the door slab 2 doesn't interfere with the door frame 4. Preferably, the retrofit door hinge 10 is universal, meaning it can be used as the top, middle, or bottom door hinge for both inswing and outswing door applications. Alternatively, the replacement door slab 2 may be mounted to the door frame 4 by means of a plurality of conventional (or standard) door hinges 110.

The process for quickly installing a replacement door according to the present invention follows.

Installation starts with unboxing a replacement (new) door slab 102 and all of its components. The replacement door slab 102 may be shipped in a 4-piece telescoping outer packaging (outer box). Inside the outer box is the replacement door slab 102, and a smaller box containing the necessary hardware to complete the installation. The replacement door slab 102 may be unboxed by rolling the box over so that it is resting on its long edge to make it easy to unbox. Plastic straps surrounding the box are cut, and the two upper quadrants of the box are removed and set aside. Next, the bottom quadrants may be removed by sliding them away from the top and bottom ends of the box. Inside the box is the new, replacement door slab 102 that may have foam corner and edge protectors applied.

Supplied with the replacement door slab 102 is an adaptable door mounting support (or stand) 20 according to an exemplary embodiment of the present invention. Alternatively, the adaptable door mounting support 20 may be purchased separately.

Figure 7:
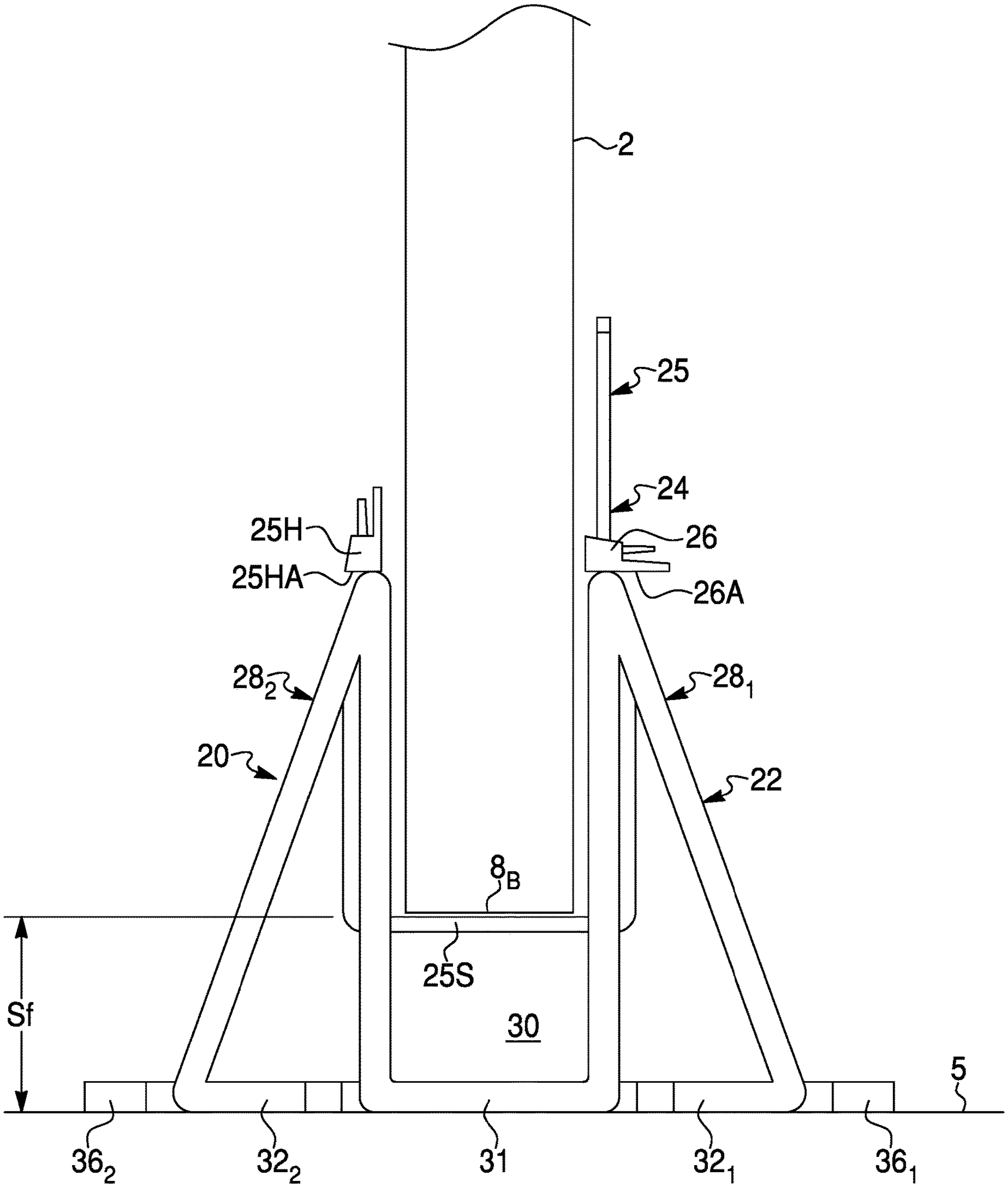
FIG. 7 is a side view of the door mounting support according to the exemplary embodiment of the present invention supporting the door slab.
Figure 15:
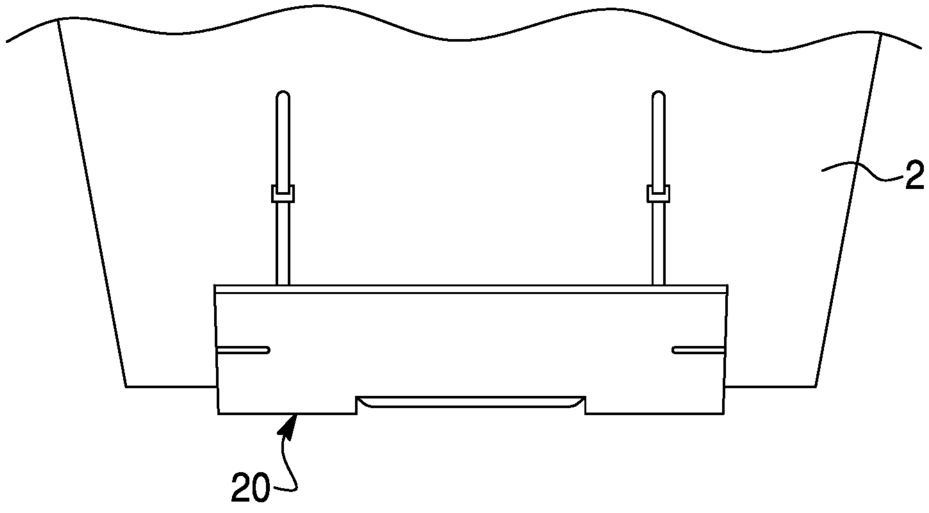
FIG. 15 is a side view of the door mounting support according to the exemplary embodiment of the present invention supporting the door slab.
Figure 16:
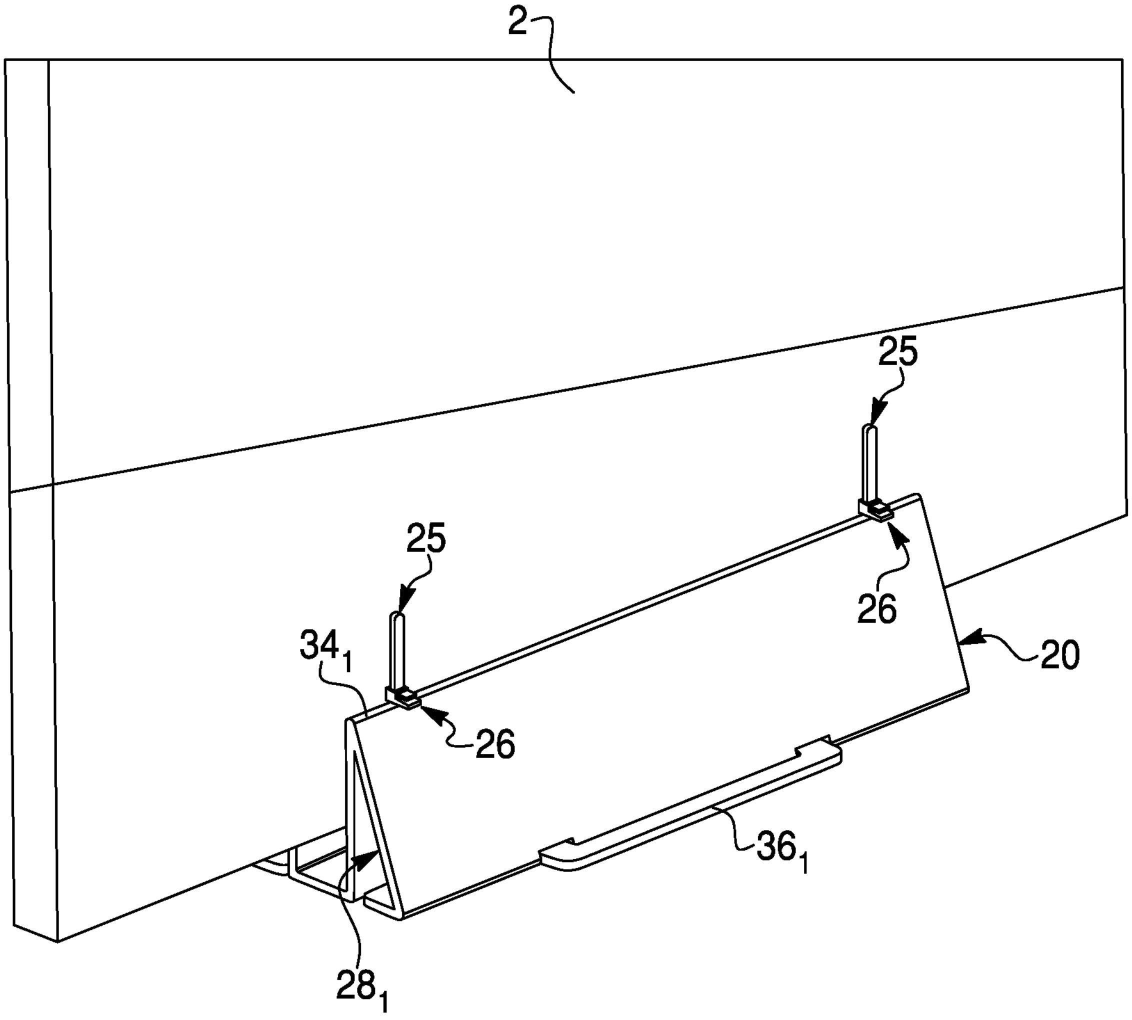
FIG. 16 is an enlarged perspective view of the door mounting support supporting a door slab.

The adaptable door mounting support 20 is configured to acquire a distance (or door gap) Sf, as best shown in FIG. 1, between a bottom edge $8_B$ of the door slab 2 (such as of an existing door slab) mounted to the door frame 4 through the door hinges 10, 110 and the floor (or ground) 5, as shown in FIG. 1. The distance Sf is the height of the existing door slab 2 off the floor 5. The door mounting support 20 also supports the door slab 2 (such as a replacement door slab), as shown in FIGS. 7, 15 and 16, at the same distance Sf from the floor 5 as the existing door slab 2 to facilitate installation of the replacement door slab 2 to the door frame 4.

The adaptable door mounting support 20 comprises a frame member 22 and one or more (preferably two, as shown in FIGS. 3A, 3B and 4-7) tie devices 24. The tie devices 24 meter the height of the existing door slab 2 from the floor 5, and hold the new door slab in place at the metered height (i.e., to provide a vertical support for the door slab 2) during installation of the new door slab 102.

The frame member 22 is constructed of foldable material, such as corrugated cardboard. The frame member 22 includes first and second A-shaped segments $28_1$ and $28_2$, respectively, interconnected by a bottom section 31 and together defining a door support channel 30 therebetween. It will be appreciated that the frame member 22 may be made of other appropriate materials, such as corrugated plastic.

Figure 8:
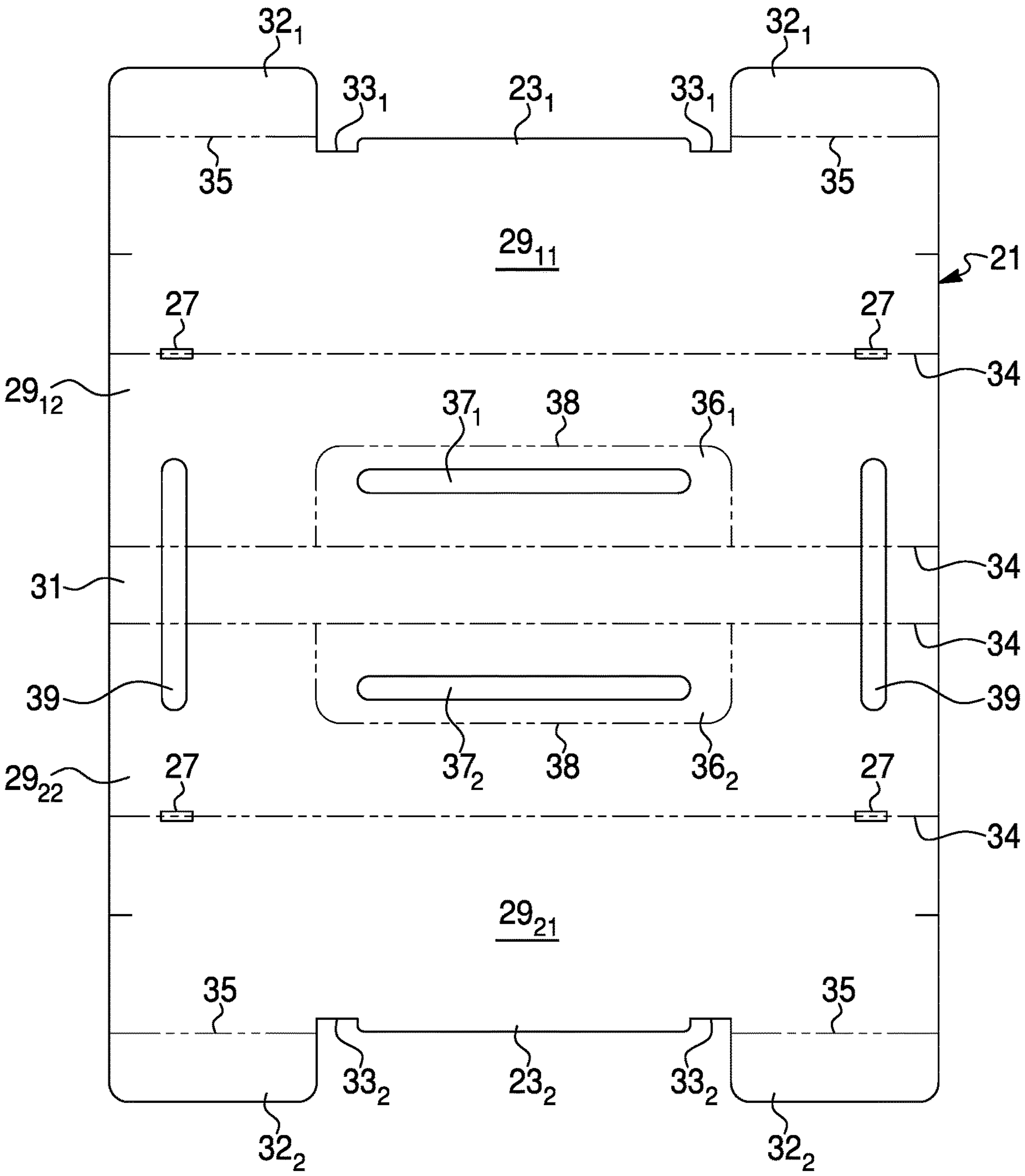
FIG. 8 is a top view of a flat sheet used to form the door mounting support according to the exemplary embodiment.
Figure 9:
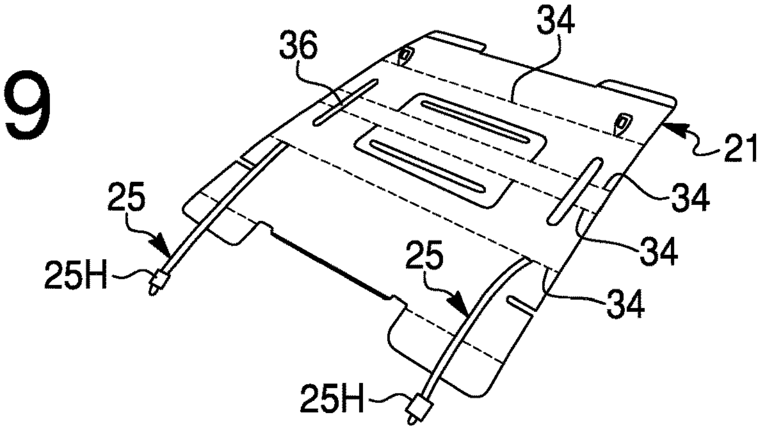
FIG. 9 is a perspective view of the flat sheet provided for forming the door mounting support according to the exemplary embodiment with pre-threaded cable ties.

As best shown in FIGS. 8 and 9, the frame member 22 is initially a flat rectangular sheet 21 of corrugated cardboard having a plurality of (such as five, as shown in FIGS. 8 and 9) transverse, parallel pre-scored fold lines 34 extending across the entire width of the flat sheet 21. The flat sheet 21 may be folded along the fold lines 34 to initially prepare the sheet 21 for receipt of ties 24. The transverse pre-scored fold lines 34 divide the flat sheet 21 into five interconnected rectangular sections: first and second outer rectangular sections $29_{11}$ and $29_{21}$, respectively, first and second inner rectangular sections $29_{12}$ and $29_{22}$, respectively, and bottom section 31 extending between the first and second inner rectangular sections $29_{12}$ and $29_{22}$. The fold lines 34 define a longitudinal direction of the frame member 22, while the direction perpendicular to the fold lines 34 defines a transversal direction of the frame member 22.

The fold lines 34 allow the outer sections $29_{11}$ and $29_{21}$ to be folded relative to the inner sections $29_{12}$ and $29_{22}$, and the inner sections $29_{12}$ and $29_{22}$ to be folded relative to the bottom section 31 in order form first and second A-shaped segments $28_1$, $28_2$, and to erect the flat sheet 21 into the frame member 22. In this way, the sheet 21 is transformed into the frame member 22 from a flat state, best shown in FIG. 8, to an erected state, best shown in FIGS. 3A, 3B and 2-7. The first A-shaped segment $28_1$ is formed with a first central top ridge $34_1$ along the corresponding fold line 34, while the second A-shaped segment $28_1$ is formed with a second central top ridge $34_2$ along the corresponding fold line 34.

The distance between the inner rectangular sections $29_{12}$ and $29_{22}$ of the frame member 22 in the transverse direction (i.e., a width of the door support channel 30) is slightly larger than a thickness of the door slab 2. Typical door slabs are usually about 1.5 to 2.0 inches thick. Of course, the fold lines 34 may be spaced so as to accommodate door slabs of greater or lesser thickness. The door support channel 30 of the frame member 22 is configured to receive a portion of a conventional door slab therein.

Each of the inner rectangular sections $29_{12}$ and $29_{22}$ has two elongated tie apertures 39 extending between the inner rectangular sections $29_{12}$ and $29_{22}$ through the bottom section 31. The elongated tie apertures 39 extend transverse to the fold lines 34. Furthermore, each of the inner sections $29_{12}$ and $29_{22}$ is formed with a U-shaped cut line 38, such as formed by perforations. The U-shaped cut lines 38 are located on the inner sections $29_{12}$ and $29_{22}$ of the flat sheet 21 adjacent (juxtaposed) to the bottom section 31. The U-shaped cut lines 38 define a first fixing plate $36_1$ in the first inner sections $29_{12}$ and a second fixing plate $36_2$ in the second inner sections $29_{22}$. As best shown in FIG. 8, the first fixing plate $36_1$ is formed with a first elongated support opening $37_1$, while the second fixing plate $36_2$ is formed with a second elongated support opening $37_2$. Each of the first and second elongated support openings $37_1$ and $37_2$ extends parallel to the fold lines 34.

The flat sheet 21 further includes first corner tabs $32_1$ foldable relative to the first outer rectangular section $29_{11}$ along fold lines 35, and second corner tabs $32_2$ foldable relative to the second outer rectangular section $29_{21}$ along the fold lines 35, as best shown in FIG. 8. The fold lines 35 separate the first and second outer rectangular sections $29_{11}$ and $29_{21}$ from the first and second corner tabs $32_1$ and $32_2$, respectively. Moreover, the first corner tabs $32_1$ and the second corner tabs $32_2$ are spaced from each other along the direction parallel to the fold lines 34 and 35.

The flat sheet 21 also has first and second holder tabs $23_1$ and $23_2$, respectively. The first holder tab $23_1$ is formed on the first outer rectangular section $29_{11}$ of the flat sheet 21 along an outer edge thereof between the first foldable corner tabs $32_1$ and between two first indentations $33_1$. The second holder tab $23_2$ is formed on the second outer rectangular section $29_{22}$ of the flat sheet 21 along an outer edge thereof between the second foldable corner tabs $32_2$ and between two second indentations $33_2$. The first and second holder tabs $23_1$ and $23_2$ are configured to be received in the first and second elongated support openings $37_1$ and $37_2$, respectively.

Each of the tie devices 24 may be a cable tie (or zip tie) 25 and a retaining member (or locking tab) 26, typically a toothed connector, attached to the cable tie 25 by sliding over the free distal end of a strap 25S of the cable tie 25 towards head member 25H in order to lock the cable tie 25 in place. The strap 25S of the cable tie 25 is threaded (i.e., passed through) through one of the tie cuts or holes 27 formed through the first and second central top ridges $34_1$, $34_2$ of the first and second A-shaped segments $28_1$, $28_2$ of the frame member 22 (best shown in FIG. 8), and through the tie aperture 39. It will be appreciated that the retaining members 26 are slidable along the straps 25S of the cable ties 25 only in one direction, specifically from the free distal ends of the cable ties 25 toward the head members 25H. Alternatively, the head member 25H also may be slidable over the straps 25S of the cable ties 25 only in one direction, specifically toward the retaining members 26.

Figure 4:
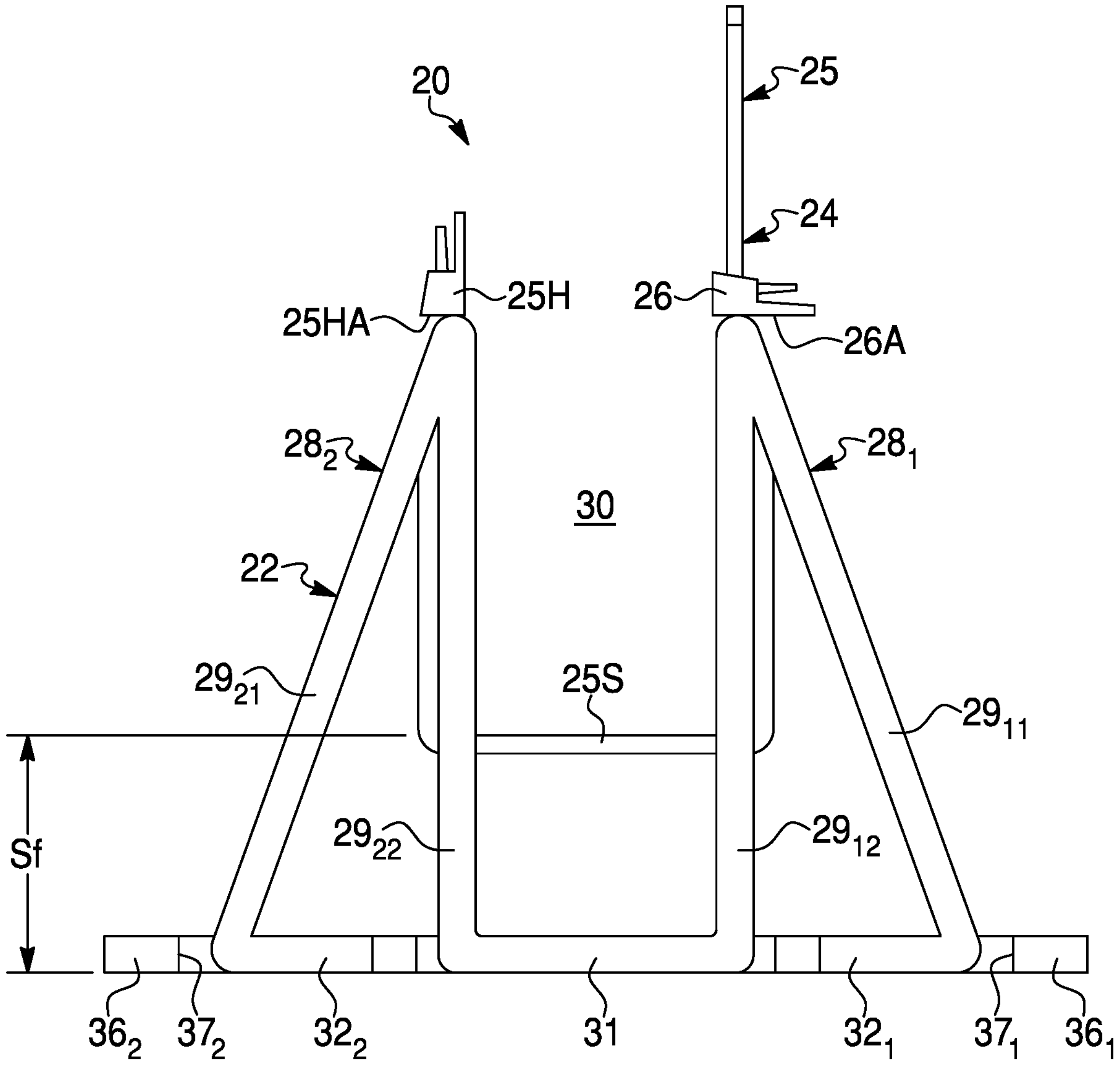
FIG. 4 is a side view of the door mounting support according to the exemplary embodiment of the present invention.
Figure 5:
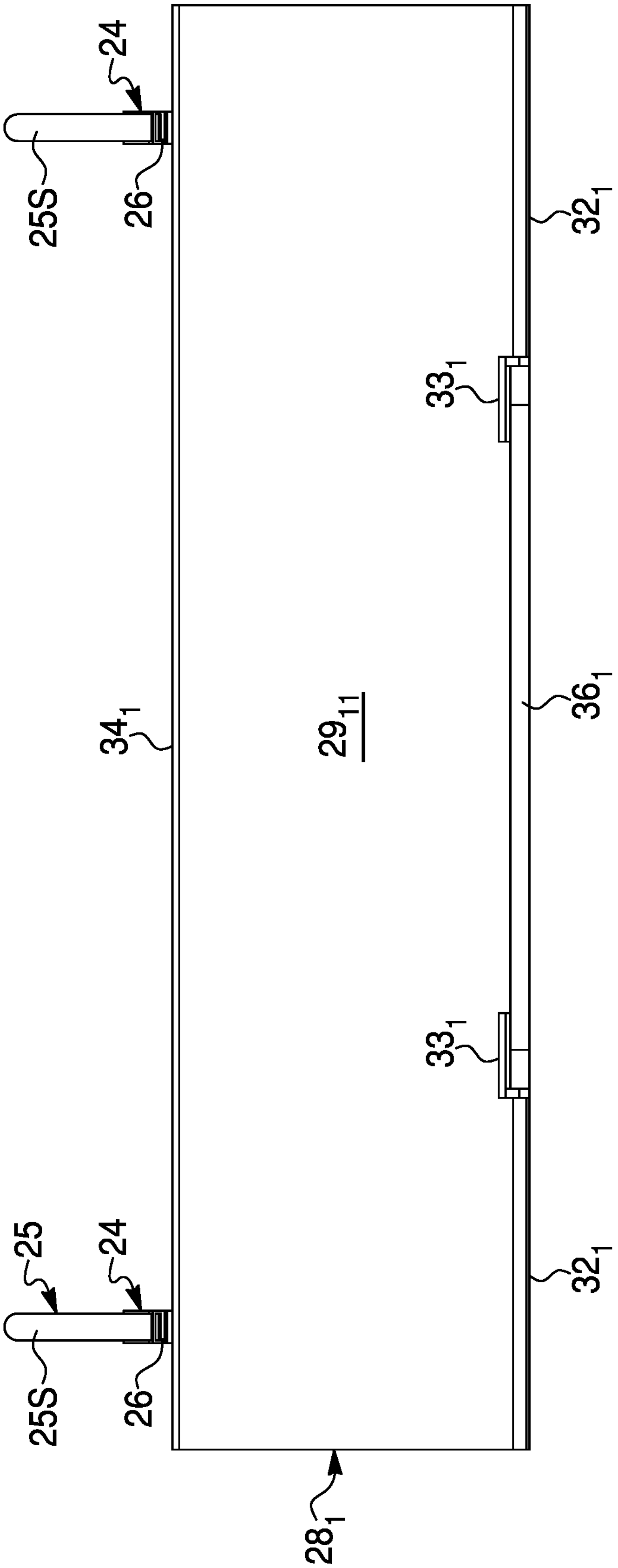
FIG. 5 is a front view of the door mounting support according to the exemplary embodiment of the present invention.
Figure 6:
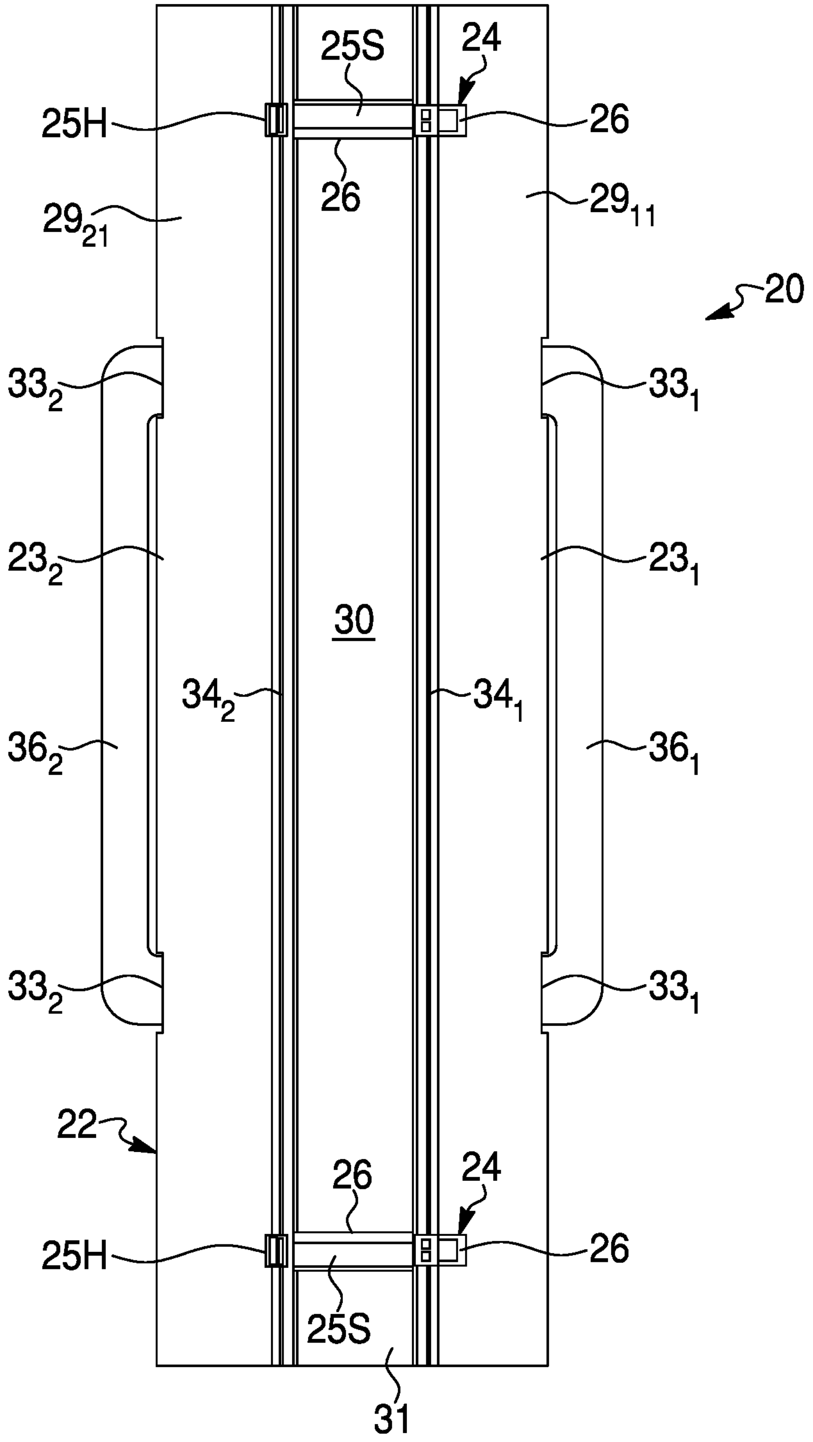
FIG. 6 is a top view of the door mounting support according to the exemplary embodiment of the present invention.

As best shown in in FIGS. 4 and 7, the head member 25H and the retaining member 26 have large lower surfaces 25HA and 26A, respectively, where they meet the central top ridges $34_1$, $34_2$ of the first and second A-shaped segments $28_1$, $28_2$ that provide sufficiently broad area to resist pulling through the cardboard material of the frame member 22.

A method for assembling the door mounting support 20 follows.

First, the straps 25S of the cable ties 25 are each threaded (i.e., passed through) through one of the tie cuts or holes 27 formed in the first and second central top ridges $34_1$, $34_2$ of the first and second A-shaped segments $28_1$, $28_2$ of the sheet 21, and through the tie apertures 39. Once each of the straps 25S of the cable ties 25 extends completely through the associated tie cuts (or holes) 27 and the tie aperture 39 in the frame member 22, the locking tabs 26 are attached to the cable ties 25 by being slid over the straps 25S toward the head members 25H to positions adjacent to the free distal ends of the straps 25S, thus forming the door mounting support 20. Alternatively, the sheet 21 is provided flat with the pre-threaded tie devices 24, as best shown in FIG. 9.

Then, the first and second fixing plates $36_1$ and $36_2$ in the first and second inner rectangular sections $29_{12}$ and $29_{22}$ of the sheet 21 are pushed or pulled from the corresponding first and second inner rectangular sections $29_{12}$ and $29_{22}$ along the cut lines 38 so as to disconnect the first and second fixing plates $36_1$ and $36_2$ from the corresponding first and second inner rectangular sections $29_{12}$ and $29_{22}$.

Figure 10:
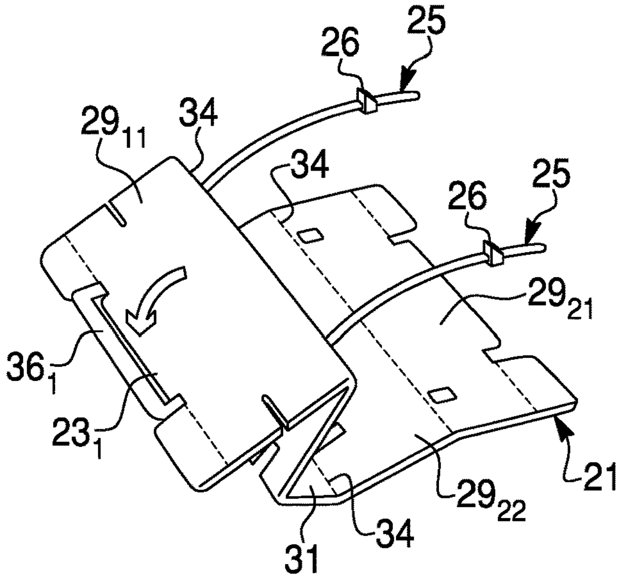
FIG. 10 is a perspective view of the flat sheet of FIG. 9 in a partially folded state.
Figure 11:
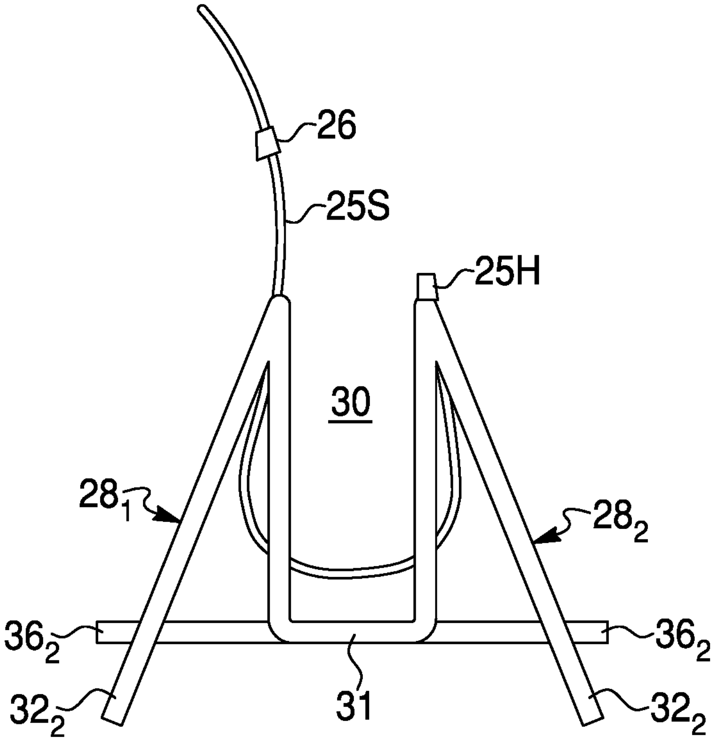
FIG. 11 is a side view of the flat sheet of FIG. 9 in a partially assembled state.

Next, the flat sheet 21 is folded along the fold lines 34 to form the first and second A-shaped segments $28_1$, $28_2$. To do so, the outer sections $29_{11}$ and $29_{21}$ are folded relative to the inner sections $29_{12}$ and $29_{22}$ of the flat sheet 21, and the inner sections $29_{12}$ and $9_{22}$ are folded relative to the bottom section 31, as best shown in FIG. 10, in order form the first and second A-shaped segments $28_1$, $28_2$, as best shown in FIG. 11. Also, the first holder tab $23_1$ is inserted into the first support openings $37_1$ to form the first A-shaped segment $28_1$, while the second holder tab $23_2$ is inserted to the second support opening $37_2$ to form the second A-shaped segment $28_2$, as best shown in FIG. 11.

Then, the first corner tabs $32_1$ are folded relative to the first outer rectangular section $29_{11}$ along fold lines 35 inside the first A-shaped segment $28_1$ and toward the first inner rectangular sections $29_{12}$ to sit flush with the ground 5. Similarly, the second corner tabs $32_2$ are folded relative to the second outer rectangular section $29_{21}$ along fold lines 35 inside the second A-shaped segment $28_2$ and toward the second inner rectangular sections $29_{22}$ to sit flush with the ground 5. In this way, the sheet 21 is transformed from the flat state (shown in FIG. 8 in the form of the flat sheet 21 of cardboard) to the erected state of the frame 22, as shown in FIGS. 12 and 13.

The method of operation (or use) of the door mounting support 20 follows.

Figure 12:
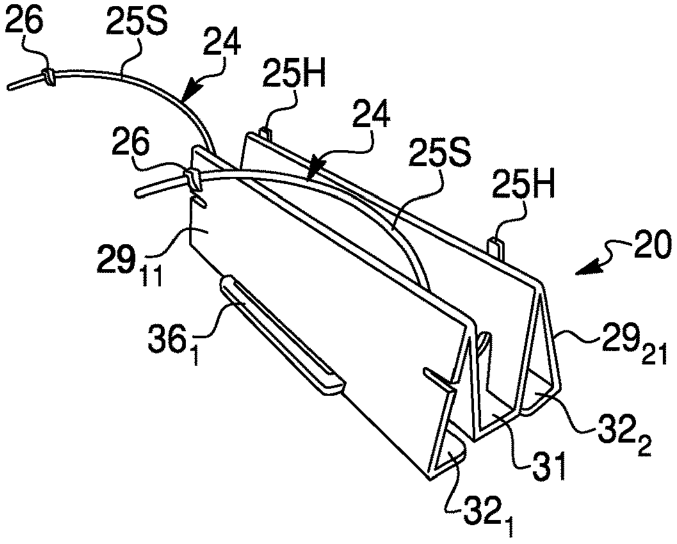
FIG. 12 is a perspective view of the flat sheet of FIG. 9 in an assembled state.
Figure 13:
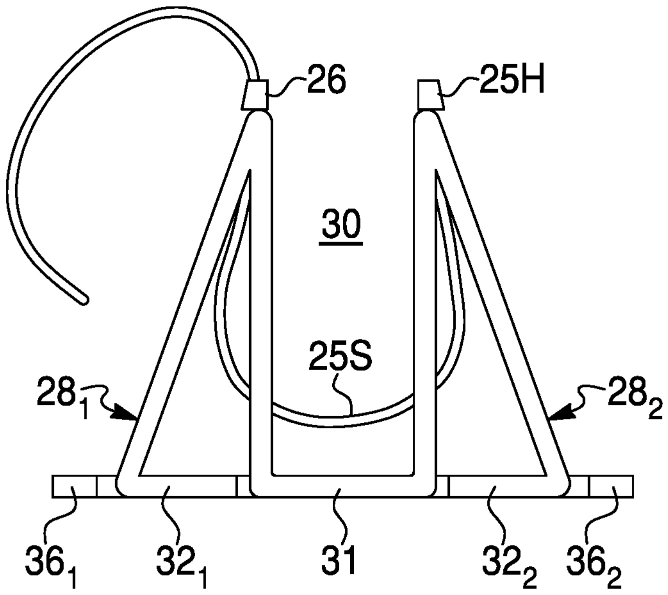
FIG. 13 is a side view of the flat sheet of FIG. 9 in an assembled state.

In use, after the door mounting support 20 is pre-assembled (i.e., pre-folded or pre-shaped and pre-threaded) as best shown in FIG. 12, the bottom section 31 of the frame member 22 (i.e., of the sheet 21 in the erected state) extends along the floor 5. The inner rectangular sections $29_{12}$ and $29_{22}$ of the door mounting support 20 extend upright relative to the floor 5, thus forming the door support channel 30 delimited by the bottom section 31 between inner rectangular sections $29_{12}$ and $29_{22}$.

Figure 14:
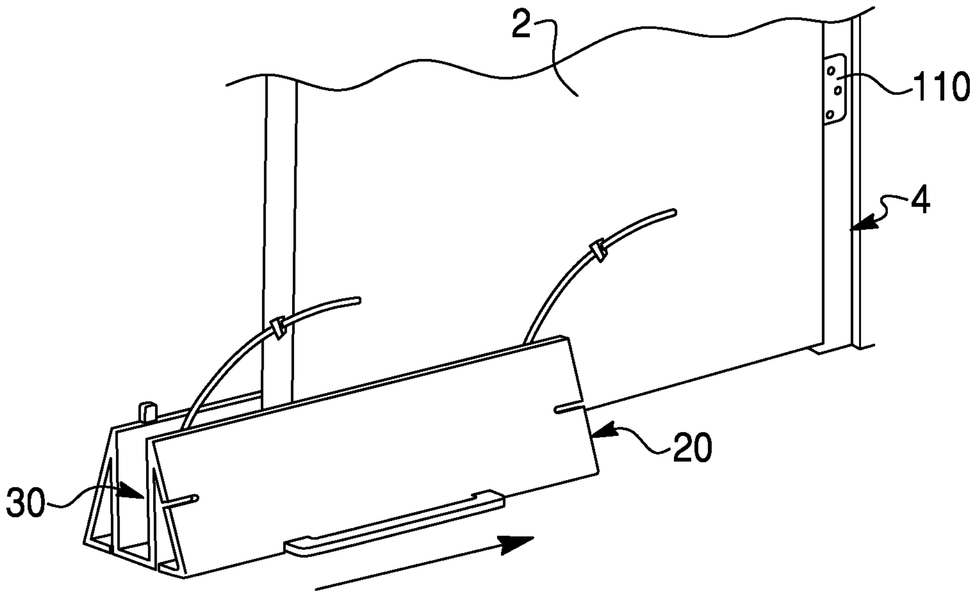
FIG. 14 is a perspective view of the door mounting support according to the exemplary embodiment of the present invention slid under the door slab.

While installing the door mounting support 20 for door removal, the installer preferably first captures the height Sf of the existing door slab 2 off the floor 5. This dimension will be transferred to the new door slab 102 during installation. In order to acquire the dimension Sf, the installer first opens the existing door slab 2, such as to about 90°. Then, the door mounting support 20 is aligned with the existing door slab so that adjustable sides of the cable ties 25 are facing the room. Next, the installer positions (by sliding) the door mounting support 20 under the bottom end portion of the existing door slab 2 (as shown in FIG. 14) hung on the door frame 4 until centered in the middle of the existing door slab 2, as shown in FIG. 15. In this way, the bottom edge $8_B$ of the door slab 2 is disposed in the door support channel 30 of the door mounting support 20.

Then, the free distal ends of the straps 25S are pulled one at a time, so that a portion of the strap 25S is raised to touch the bottom edge $8_B$ of the door slab 2. Once the straps 25S of the cable ties 25 firmly engage (or fit snug against) the bottom edge $8_B$ of the door slab 2 (i.e., reach the height of the door gap Sf), the locking tabs 26 are slid (or pushed down) by the installer toward the head member 25H and toward the first central top ridge $34_1$ of the first A-shaped segment $28_1$, thus tightening the cable ties 25 and locking each cable tie 25 in place (as best shown in FIGS. 7 and 16). As a consequence, the door mounting support 20 is locked into shape, position and place by pulling on the straps 25S of the cable tie 25 while using the locking tabs 26. Because of the straps 25S of the cable ties 25 and their locking tabs 26, the door mounting support 20 is set at a position where the dimension Sf is acquired as a consequence of the bottom edge $8_B$ of the door slab 2 resting on the straps 25S of the cable ties 25 of the door mounting support 20. Thus, the door mounting support 20 acquires (determines or captures) the door gap Sf (i.e., the distance from the bottom edge $8_B$ of the door slab 2 from the floor 5). The door mounting support 20 is capable of capturing any door gap Sf between about ⅜" to 1½", which is sufficient for most installations. Thus, the door mounting support 20 is adjustable to accommodate door assemblies with various door gaps Sf. Additionally, the door mounting support 20 may serve as a "third hand" for the installer.

Figure 17:
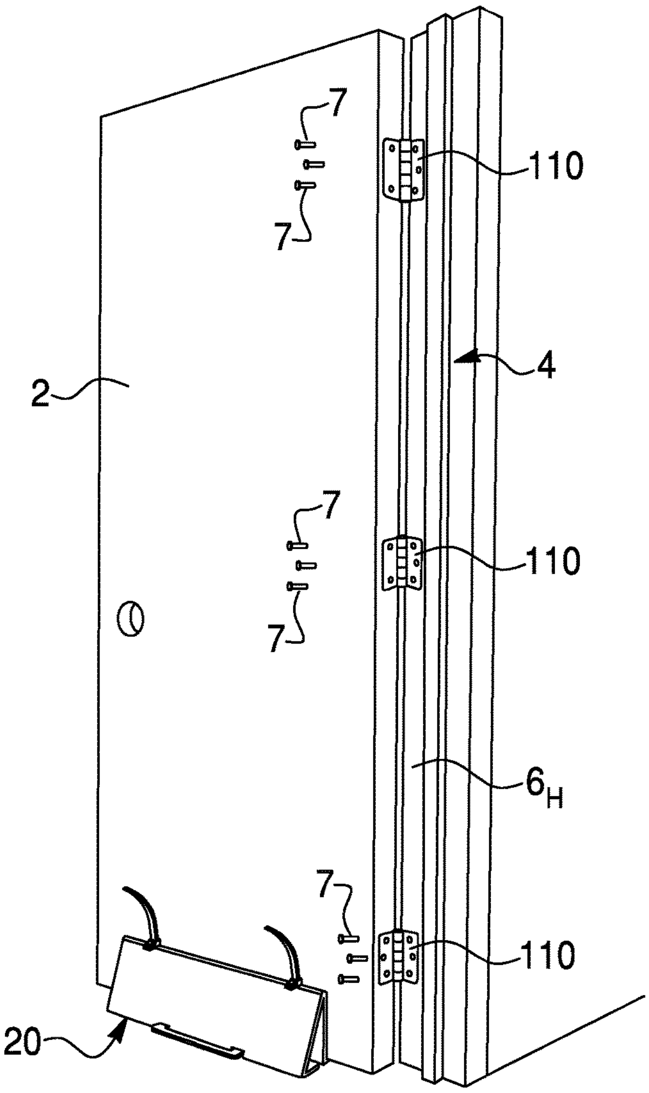
FIG. 17 illustrates the step of removing the door slab from a door frame while being supported by the door mounting support.
Figure 18:
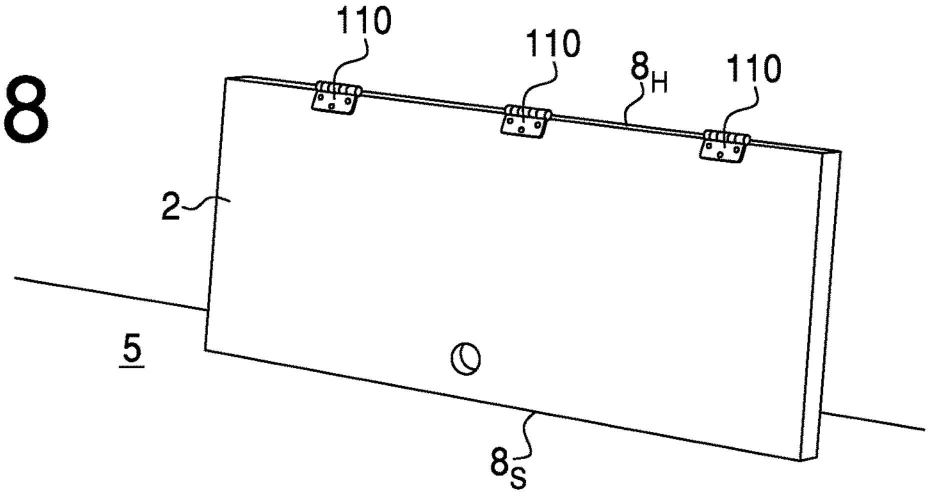
FIG. 18 illustrates the door slab placed onto the floor.

The door mounting support 20 is left in place for removal of the door slab 2 from the frame 4. Next, the existing (or old) door hardware, such as the handle and latch barrel, is removed and set aside. The existing door hardware may be removed after or before the door mounting support 20 acquires the door gap Sf. Then, while the old door slab 2 is still supported by the door mounting support 20, the existing (or old) hinges 110 are removed from the door frame 4, as shown in FIG. 17. The recommended order involves removing the bottom hinge first, then the middle hinge (or hinges in the case of a door with more than three hinges), and finally the top hinge. Removing screws 7 from the frame hinge leaves only leaf of each of the existing hinges 110, thus leaving the door hinge leaves attached to the door slab 2, as best shown in FIG. 18. With all existing hinges 110 removed from the door frame 4, the door slab 2 is removed from the door opening and from the door mounting support 20. Next, the door slab 2 is set down on the strike side 8*s* opposite the hinge side $8_H$ so that the existing hinges 110 are facing up, toward the installer, as best shown in FIG. 18.

Next, a door hinge jig 40 is used to capture (i.e., acquire or determine) the location of the top hinge top side (or top edge) $8_T$ on the existing door. FIGS. 19-29 depict the door hinge jig (or hinge tool) that assists with consistent and accurate installation of a horizontally swinging replacement door slab 2 by means of a plurality of vertically spaced easy install replacement hinges 10. The hinge jig 40 is configured to locate the new upper hinge with proper backset, which further prevents poor installation. The hinge jig 40 is also configured to hold the new easy install hinges as well as a standard hinge.

Figure 19:
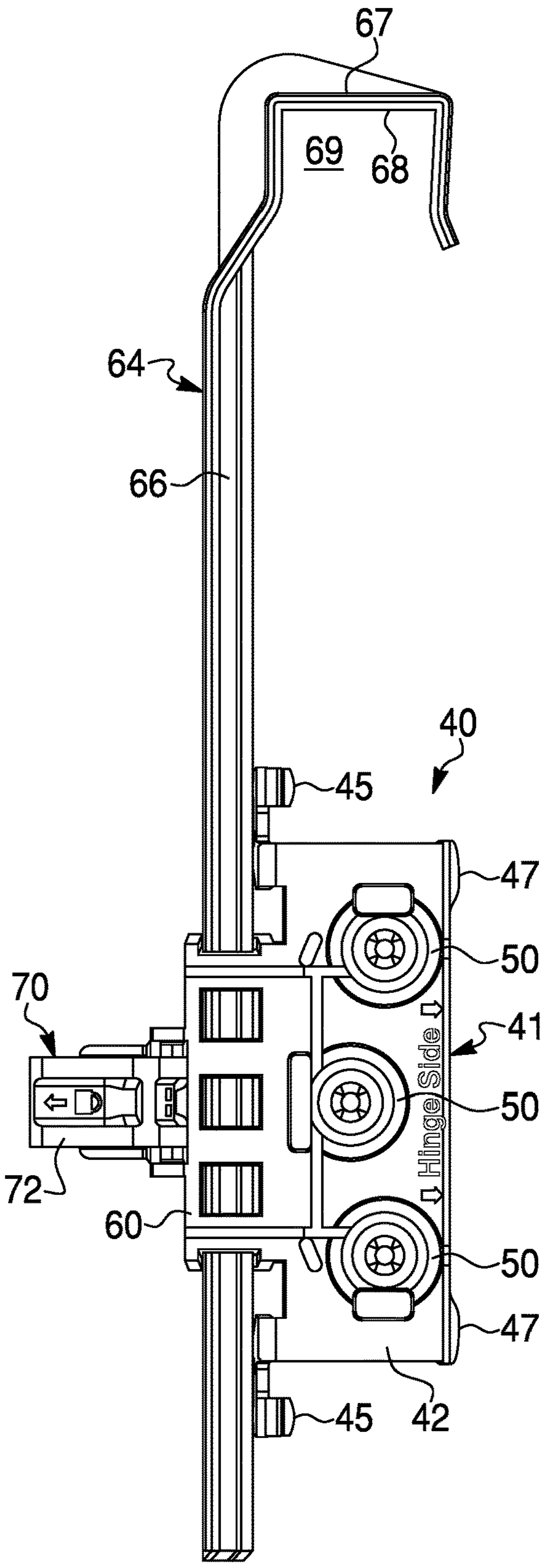
FIG. 19 is a top view of a door hinge jig according to an exemplary embodiment of the present invention.
Figure 20:
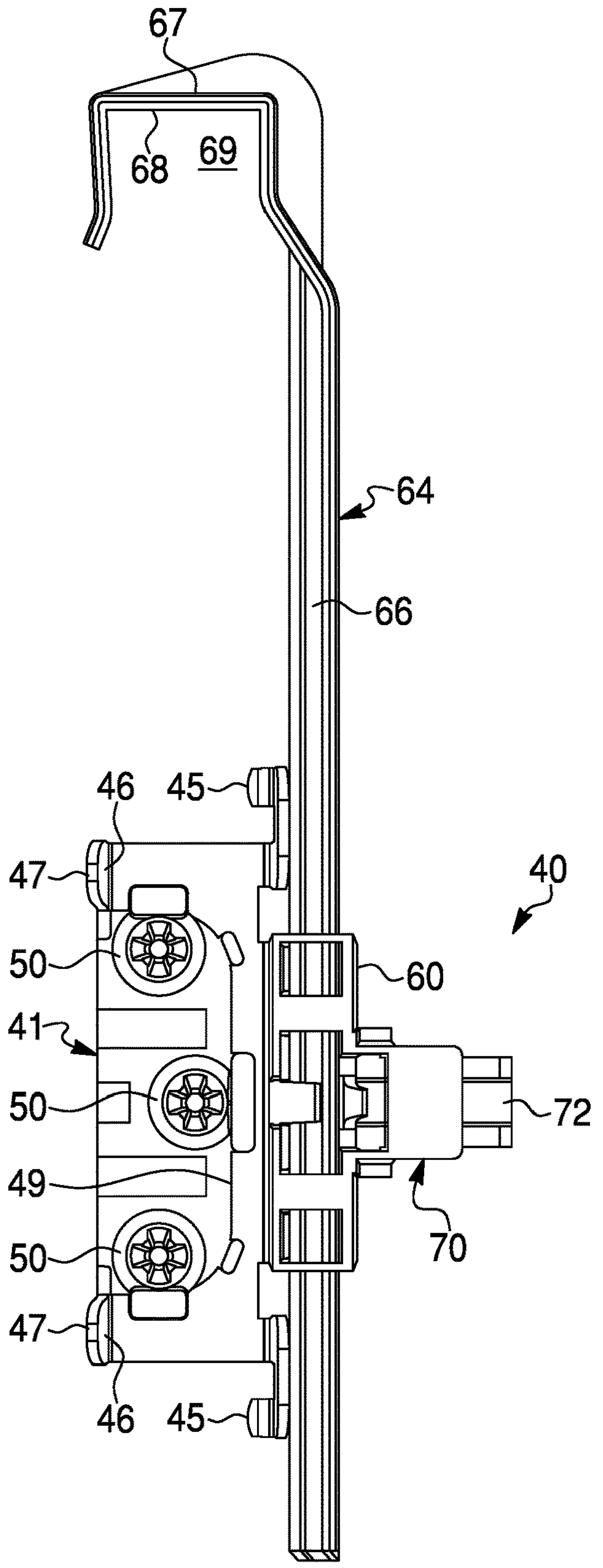
FIG. 20 is a bottom view of the door hinge jig according to the exemplary embodiment of the present invention.
Figure 21:
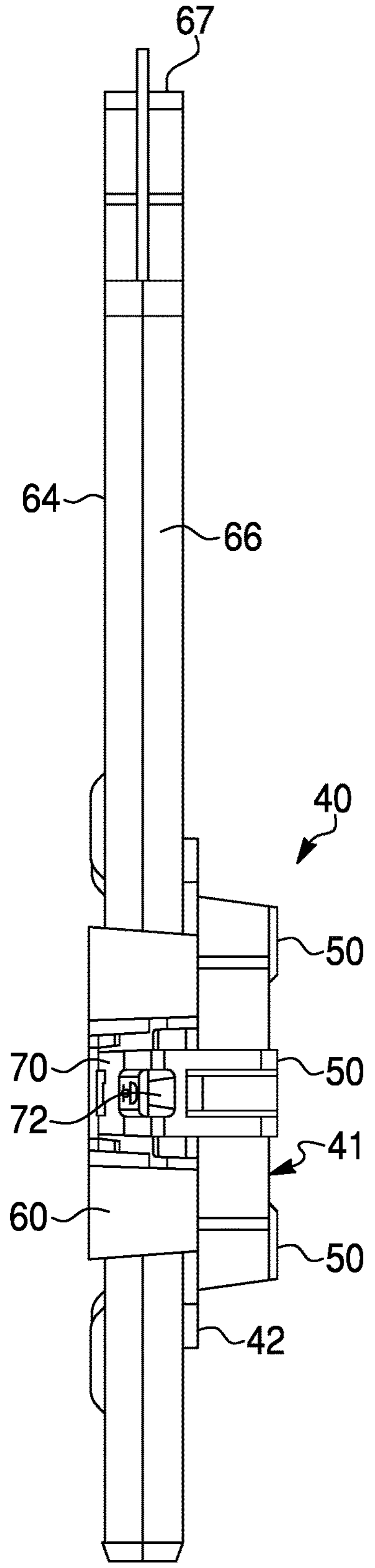
FIG. 21 is a front view of the door hinge jig according to the exemplary embodiment of the present invention.
Figure 22:
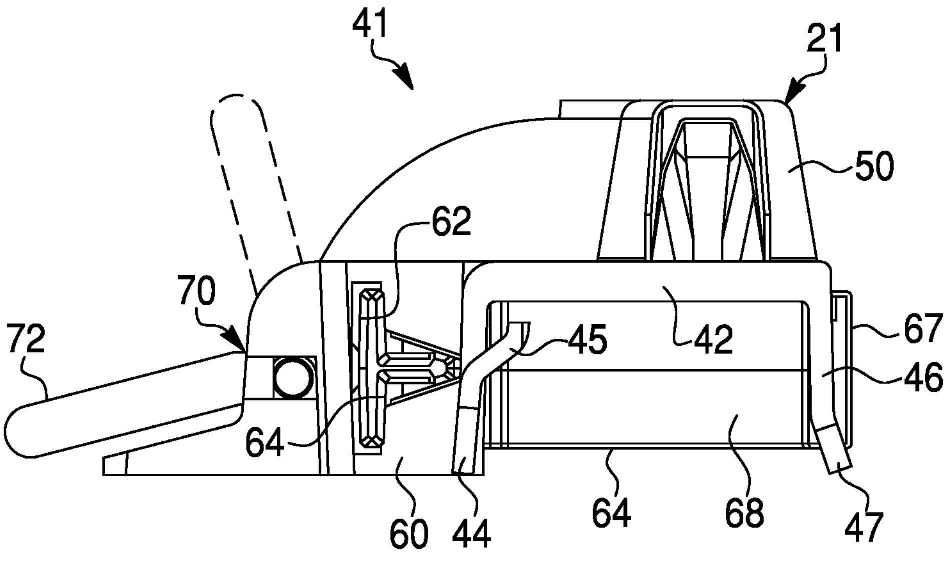
FIG. 22 is a side view of the door hinge jig according to the exemplary embodiment of the present invention.
Figure 23A:
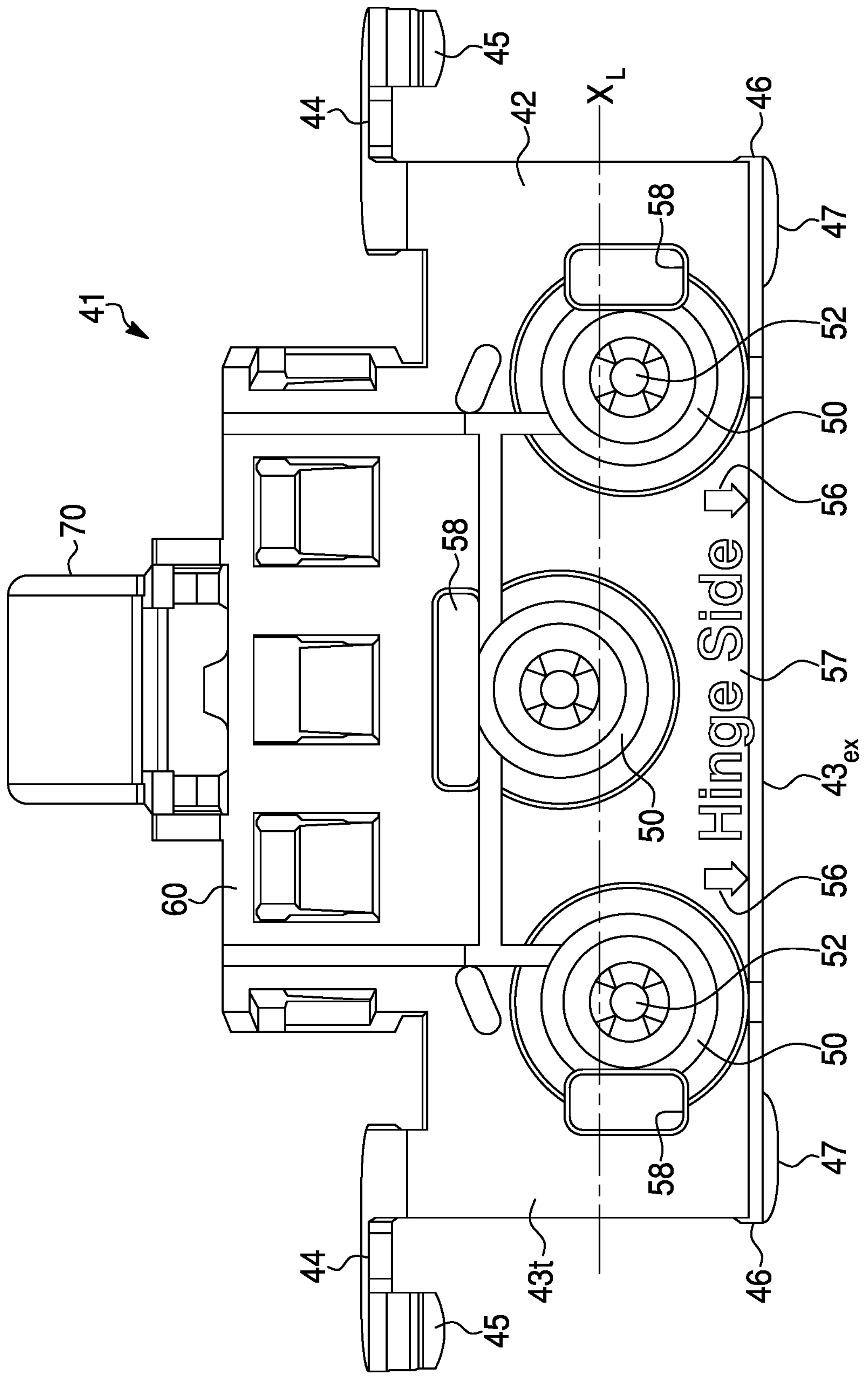
FIG. 23A is a top view of a hinge block of the door hinge jig according to the exemplary embodiment of the present invention.
Figure 23B:
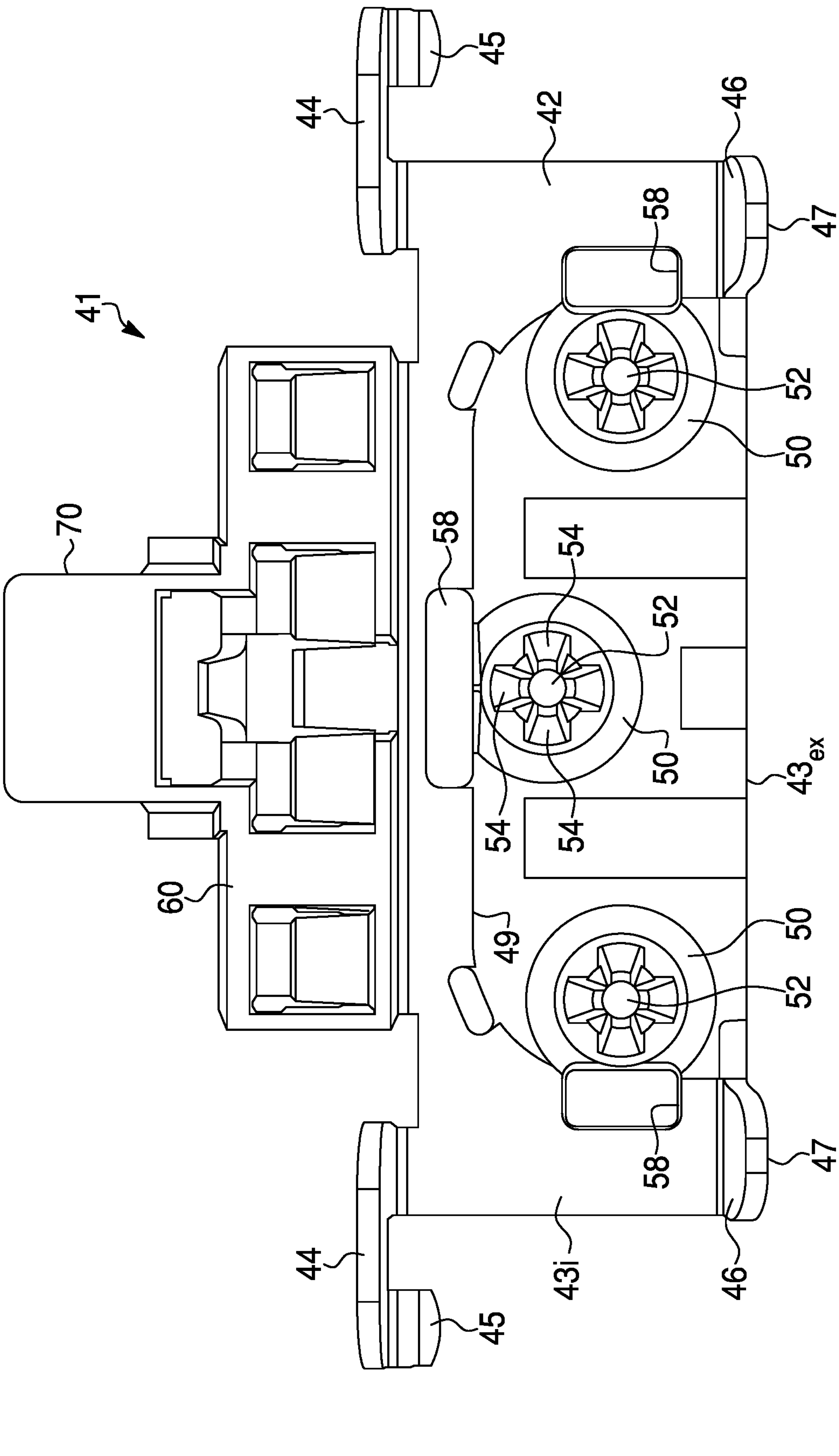
FIG. 23B is a bottom view of the hinge block of the door hinge jig according to the exemplary embodiment of the present invention.
Figure 24A:
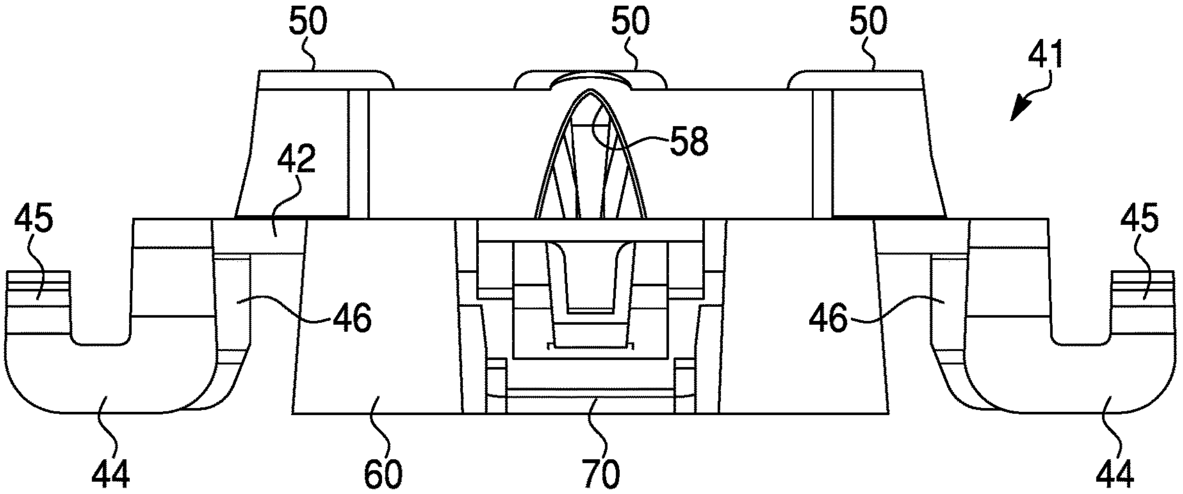
FIG. 24A is a left-side view of the hinge block according to the exemplary embodiment of the present invention in a longitudinal direction.
Figure 24B:
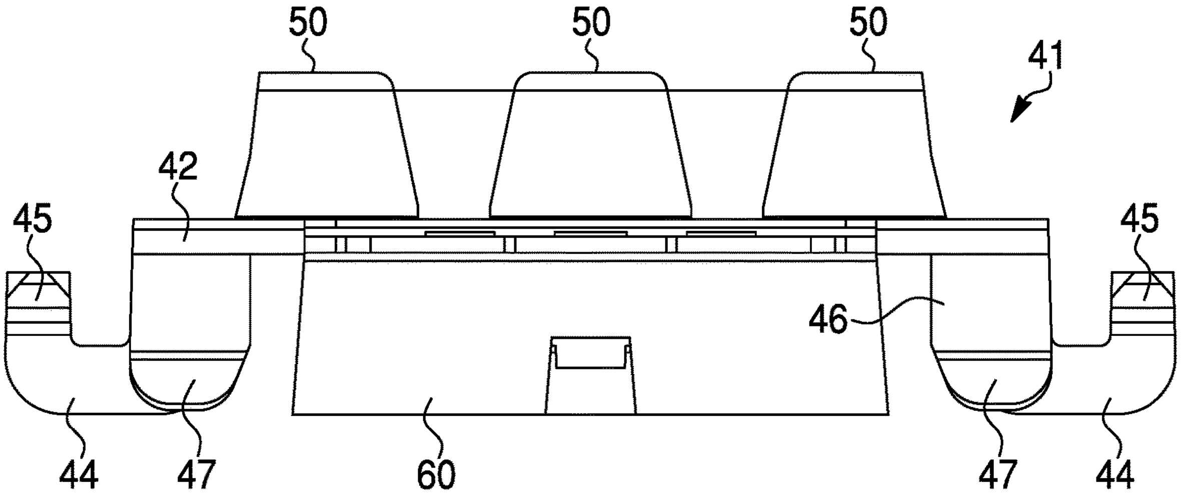
FIG. 24B is a right-side view of the hinge block according to the exemplary embodiment of the present invention in the longitudinal direction.

The door hinge jig 40 comprises a hinge block 41 and a slide bar 64 (or J-hook) slidably mounted to the hinge block 41, as best shown in FIGS. 19-22. In turn, the hinge block 41 comprises a base member 42, at least one and preferably two first restraining arms 44, and at least one and preferably two second guide (or restraining) arms 46, as best shown in FIGS. 23A-25. The hinge block 41 is made of metal or plastic material, preferably an injection molded biodegradable polymer composite with the consistency of polypropylene. The first and second guide arms 44 and 46 are formed integrally with the base member 42. The first and second guide arms 44 and 46 extend outwardly from the base member 42 and are disposed opposite one another to define a jig channel 48 between the guide members 44 and 46. The hinge block 41 has a longitudinal axis $X_L$, a flat (or planar) rectangular inner surface 43*i*, and an outer surface 43*t* opposite the inner surface 43*i*, as best shown in FIG. 23A. The flat outer surface 43*t* of the base member 42 is marked with at least one and preferably two arrows 56 and provided with an inscription, such as "Hinge Side" 57, as best shown in FIGS. 19 and 23A, to indicate how to mount the door hinge jig 40 to the hinge side $\mathbf{8}_H$ of the replacement door slab 2, as best shown in FIG. 26-28B. The flat inner surface 43*i* of the base member 42 is configured to engage the door hinge leaf 12 of the replacement door hinge 10. An impression (or recess) 49 is formed on the inner surface 43*i* of the base member 42, as best shown in FIGS. 20 and 23B. The recess 49 is sized to receive the door hinge leaf 12 of the replacement hinge 10.

Figure 25:
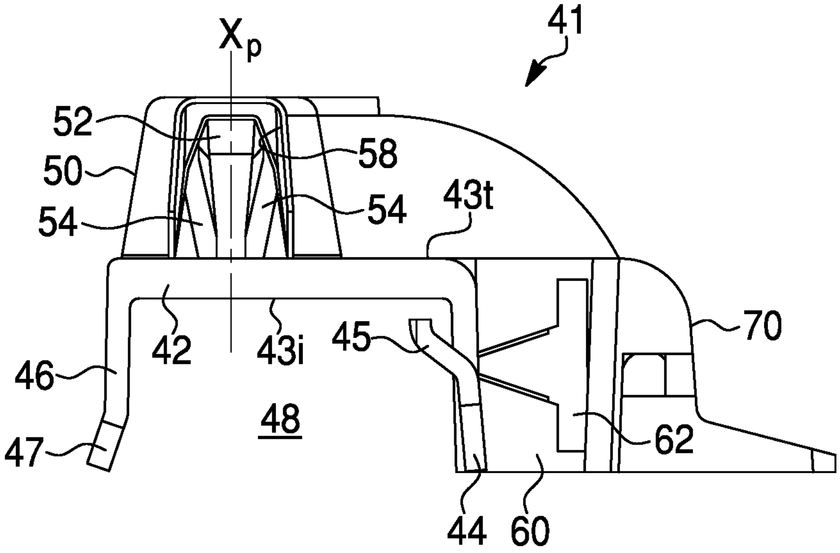
FIG. 25 is a side view of a hinge block according to the exemplary embodiment of the present invention in a transverse direction.

The guide arms 44 and 46 are connected to the base member 42 and extend outwardly (in a direction away) from the inner surface 43*i* of the base member 42. Preferably, the first and second guide arms 44 and 46 extend from the base member 42 at an oblique angle, as best shown in FIG. 25. Moreover, the first and second guide arms 44 and 46 are disposed opposite one another in a direction orthogonal to the longitudinal axis $X_L$. The guide arms 44 and 46 are sized and configured to receive and grip the replacement door slab 2 therebetween.

Each of the first guide arms 44 includes a resilient gripping member (or tab) 45 extending inwardly from each of the first guide arms 44 transversely (i.e., orthogonally to the longitudinal axis $X_L$) toward the second guide arms 46, as best shown in FIG. 25. The resilient gripping member 45 is a flexible portion of the first guide arm 44, moveable relative to the first guide arms 44 between a rest state and a gripping state. When the hinge block 41 is mounted to the hinge side $\mathbf{8}_H$ of the door slab 2, the door slab 2 is placed into the jig channel 48 between the first and second guide arms 44 and 46 so that the hinge side $\mathbf{8}_H$ of the replacement door slab 2 faces the flat inner surface 43*i* of the base member 42. Consequently, the door slab 2 resiliently flexes the gripping members 45 of the first guide arms 44 away from the second guide arms 46, i.e., moved from the rest state into the gripping state and thus clamping the door slab 2 between the first and second guide arms 44 and 46. As a result, the hinge block 41 is snugly (or tightly) secured onto the replacement door slab 2.

Each of the second guide arms 46 includes a distal end portion 47 extending at an oblique angle to the second guide arm 46 and outwardly away from each of the first guide arms 44, as best shown in FIG. 25.

The hinge block 41 of the door hinge jig 40 further comprises at least two and preferably three protruding screw posts (or bosses) 50 protruding outwardly away from the outer surface 43*t* of the base member 42. The screw posts 50 provide a guide for locating and allowing the hinge screws to be driven. The screw posts 50 are aligned with the hinge holes and help guide the screws perpendicularly to the hinge side $\mathbf{8}_H$ of the door slab. Each of the screw posts 50 is preferably conical in shape, with a screw hole 52 extending through the protruding screw post 50. The holes 52 are resilient so that the screw may pass therethrough completely, including the relatively larger head of the screw. The positions of the screw holes 52 are complementary (or correspond) to the hinge screw bores 16 or 18 through the hinge leaves 12 or 14 of the replacement door hinge 10. Each of the screw holes 52 is formed by a plurality of spaced, flexible (or resilient) fingers 54 disposed within each of the protruding screw posts 50 and axially extend along a central axis $X_P$ of each of the screw posts 50, as best shown in FIG. 25. Preferably, each of the screw holes 52 is formed by four resilient equiangularly disposed and spaced fingers 54.

The hinge block 41 can be pre-loaded with self-drilling hinge securing screws by placing the hinge securing screws 7 into the protruding screw posts 50, so that the resilient fingers 54 of each of the screw holes 52 holds one of the hinge securing screws 7 for supporting and guiding the hinge securing screws 7 through the hinge block 41 until the associated screw 7 is embedded into the hinge side $\mathbf{8}_H$ of the door slab 2. The screw posts 50 of the hinge block 41 locate and accurately position the hinge securing screws 7, and guide the hinge securing screws 7 straight and true through the corresponding hinge screw bores 16, 18 of the replacement door hinge 10 and into the hinge side $\mathbf{8}_H$ of the door slab 2.

The hinge block 41 has a plurality of windows or cut-outs 58, such as in the screw posts 50, which allow an individual using the hinge block 41 to easily visually assure that a hinge leaf 112 or 114 of an existing door hinge 110 is seated securely, and to position the door hinge jig 40 and the hinge leaf 112 or 114 on the hinge side $\mathbf{8}_H$ of the door slab 2 with any hinge positioning markings on the hinge side $\mathbf{8}_H$ of the door slab 2. The windows or cut-outs 58 create a reveal in the screw posts 50 that allow the user to view the hinge securing screws after installation (but with the door hinge jig 40 still in place) to assure that the hinge securing screws 7 are seated securely in the hinge screw bores of the existing door hinge 110.

The hinge block 41 of the door hinge jig 40 further comprises a slide support 60 formed unitary with the hinge block 41. The slide support 60 of the door hinge jig 40 defines a slide channel 62 that is open at its opposite ends. The slide channel 62 through the slide support 60 is configured to slidably receive the slide bar 64, as best shown in FIGS. 19-22. The J-hook 64 has a straight slide portion 66 slidably extending through the slide channel 62 in the slide support 60, and a U-shaped flange portion 67 defining a door support channel 69 complementary to and engageable with the top side $\mathbf{8}_T$ of the door slab 2. The U-shaped flange portion 67 has a base surface 68 adapted to engage the top side $\mathbf{8}_T$ of the door slab 2. The straight slide portion 66 of the J-hook 64 is T-shaped in cross-section. Similarly, the slide channel 62 is also T-shaped in cross-section, complementary to the T-shaped straight slide portion 66 of the J-hook 64, and of a slightly larger size than the T-shaped cross-sectional size of straight slide portion 46 of the J-hook 64. The hinge block 41 further comprises a slide bar locking mechanism 70 having a locking lever 72 and is configured to selectively secure the J-hook 64 (i.e., render the J-hook 64 non-moveable relative to the slide support 60) or release the J-hook 64 (i.e., render the J-hook 64 moveable relative to the slide support 60). The slide support 60, the J-hook 64, and the locking mechanism 70 define a sliding mechanism that allows for accurate transfer of the location of the top door hinge 110 of the existing door slab to the same location on the new door slab 2 without the need to reference numerical measurements, use rulers, tape measures, etc. The J-hook 64 is adjustable and can be locked in any position. The J-hook 64 captures the heights of the top door hinge of the existing door without the need to take numerical measurements, which reduces the opportunity for error due to either user mistakes or ability to read a tape measure accurately. Alternatively, the door hinge jig 40 may not have the sliding mechanism (i.e., the slide support 60, the J-hook 64 and the locking mechanism 70).

Figure 26:
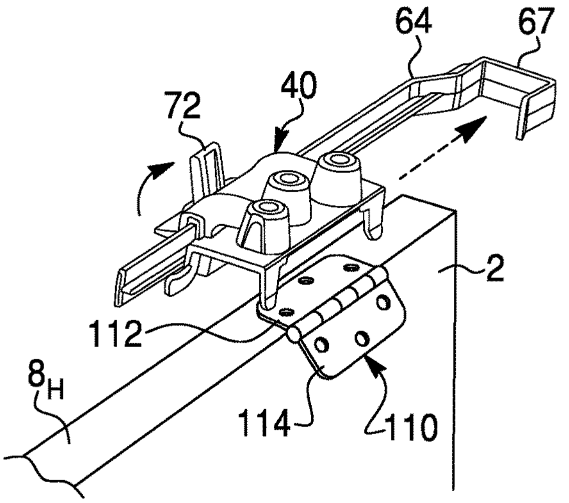
FIG. 26 shows the step of unlocking a locking mechanism of the door hinge jig of the exemplary embodiment.
Figure 27:
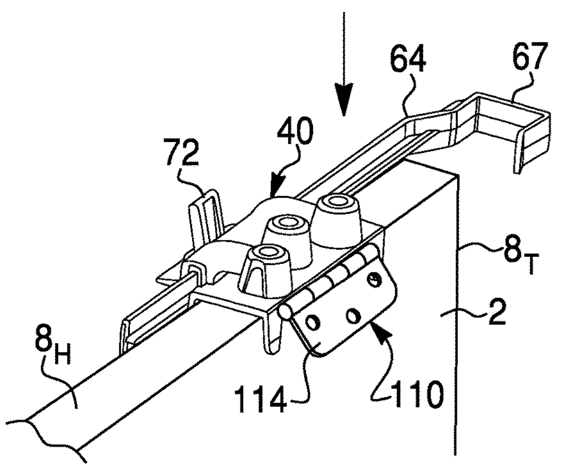
FIG. 27 shows the door hinge jig of the exemplary embodiment placed over a door side hinge leaf of a top door hinge of the door slab.
Figure 28A:
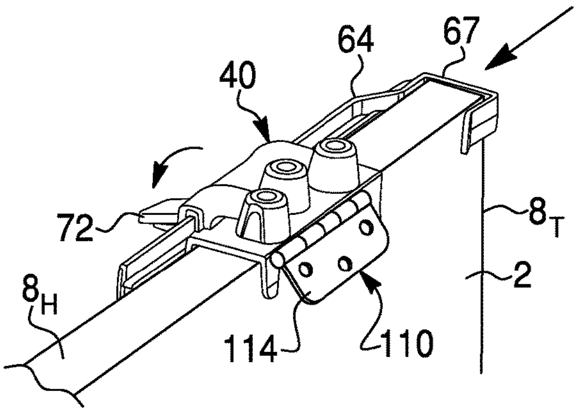
FIG. 28A is a perspective view of the door hinge jig according to the exemplary embodiment of the present invention mounted to the door slab with a J-hook adjusted so as to engage a top edge of the door slab.
Figure 28B:
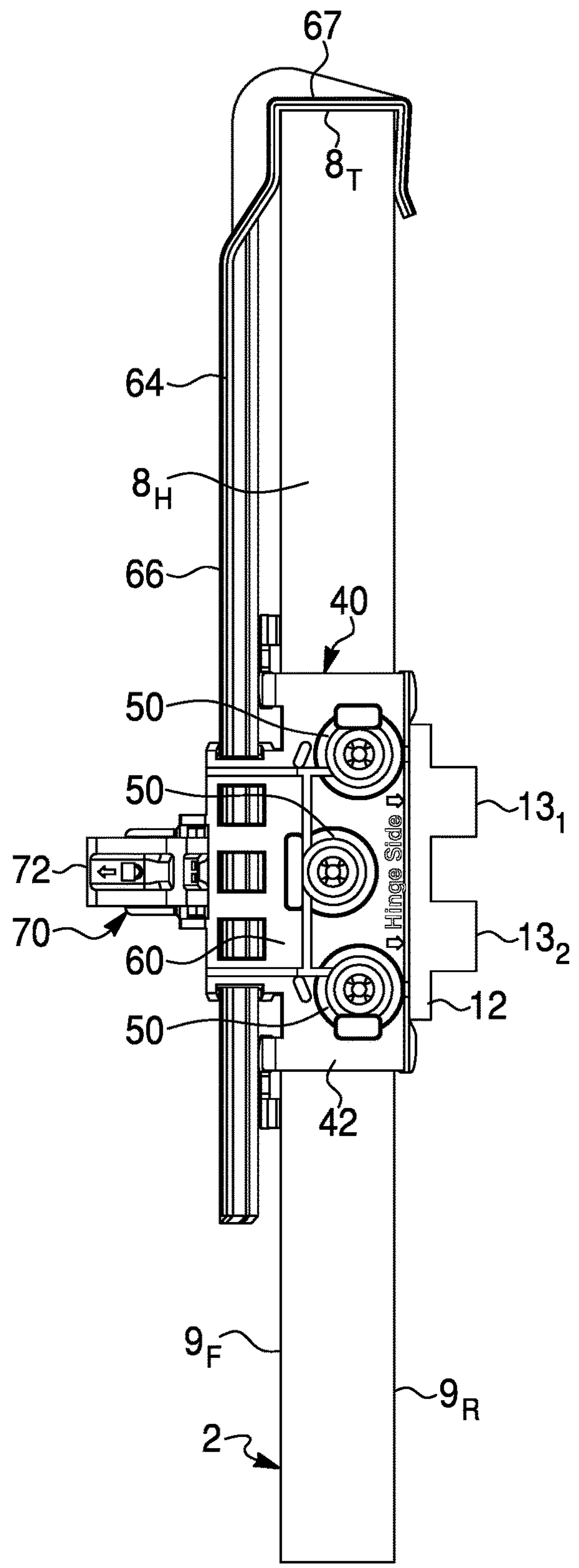
FIG. 28B is a top view of the door hinge jig according to the exemplary embodiment of the present invention mounted to the door slab with the J-hook adjusted so as to engage the top edge of the door slab.

In order to capture (i.e., acquire or determine) the location of the top hinge 110 from the top side (or top edge) $8_T$ of the existing door, the locking mechanism 70 of the hinge jig 40 is unlocked (i.e., the locking lever 72 is flipped up as shown in FIG. 26), and the door hinge jig 40 is placed (or fit) over a door side hinge leaf 112 of the top door hinge 110 of the existing door slab 2 (with the door slab 2 placed down on the strike side 8*s* thereof so that the existing hinges are facing up toward the installer), as shown in FIG. 27. Once the hinge jig 40 is fitted over the top door hinge of the existing door, the J-hook 64 is slid to hook over and be against the top edge $8_T$ of the door slab 2 (i.e., adjust the J-hook 64 until it is flush against the top edge $8_T$ of the door slab 2), as shown in FIGS. 28A and 28B. With the J-hook 64 tightly against the top edge $8_T$ of the door slab, the installer locks the location of the J-hook 64 by flipping the locking lever 72 of the locking mechanism 70 to set the height of the top hinge 110, as best shown in FIG. 28A. Thus, an accurate location of the originally installed top hinge and its screw holes is identified and located for future use. Then, leaving the J-hook 64 locked, the door hinge jig 40 is removed from the existing door slab 2 and set aside. The existing door may be removed from the installation site.

Figure 29:
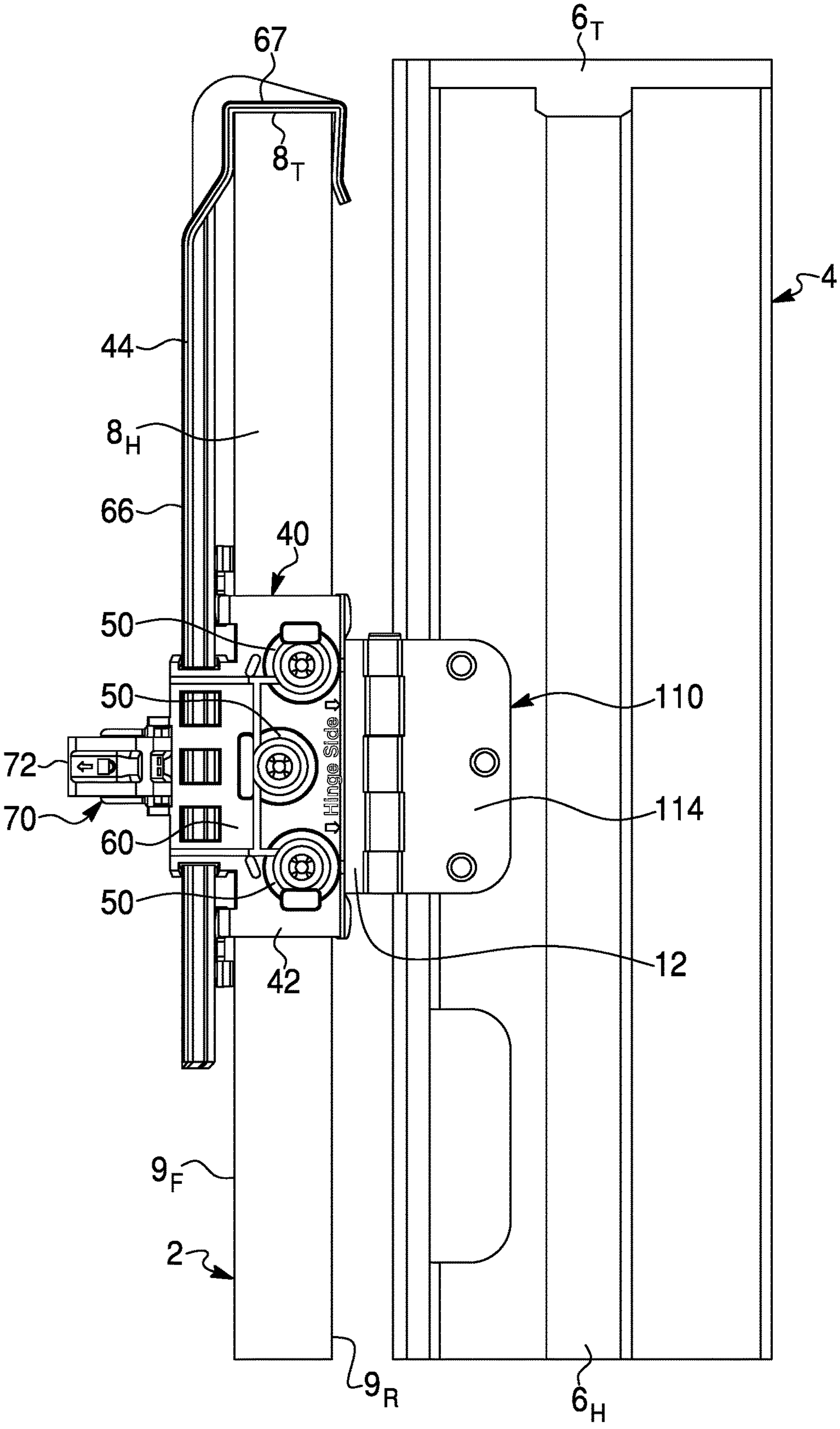
FIG. 29 is a top view of the door hinge jig with the J-hook according to the exemplary embodiment of the present invention mounted to the door slab, which is mounted to a door frame.

Alternatively, the location of the top hinge 110 may be acquired without removing the existing door from the frame, as shown in FIG. 29.

Further alternatively, the door hinge jig 40 may not have the J-hook 64. In this case, a measuring tool (such as an adjustable square ruler) is used to measure the distance Sf from the top side $8_T$ of the existing door slab to a top edge of the existing door hinge.

Figure 30:
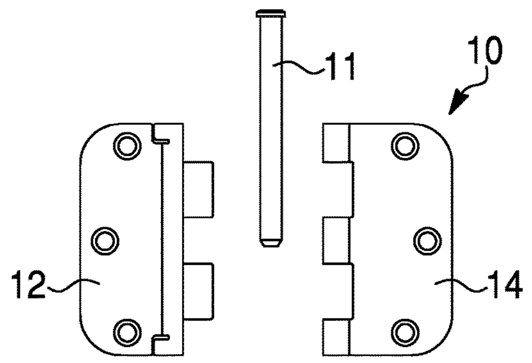
FIG. 30 shows the door hinge of the present invention in a disassembled state.
Figure 32:
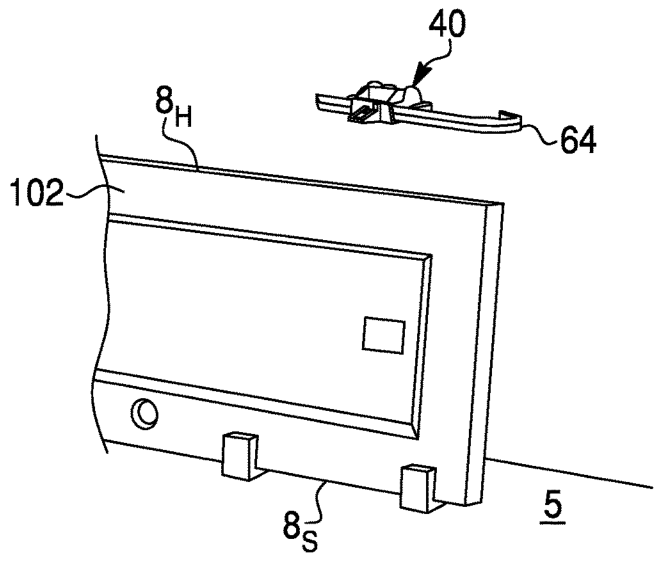
FIG. 32 shows a step of mounting the door hinge jig on a hinge side of the replacement door slab.

Next, the new (replacement) door slab 2 is brought to the installation site and set on its strike side 8*s* so that a hole for a handle set is closest to the floor 5, as shown in FIG. 32. The new replacement (easy install) hinges 10 are prepared for installation and the hinge leaves 12, 14 are separated by pulling the hinge pins 11, as shown in FIG. 30. The frame side hinge leaves 14 are set aside, as for the next steps the door side hinge leaves 12 are to be used.

Figure 31:
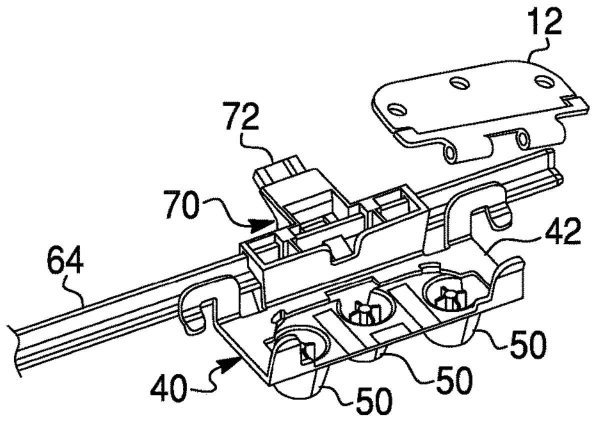
FIG. 31 shows a step of inserting a door side hinge leaf of the door hinge into the door hinge jig of the present invention.

Next, with the J-hook 64 securely locked by the locking lever 72, the door hinge jig 40 is flipped upside down, and the door side hinge leaf 12 of one of the easy install hinges 10 is inserted into the door hinge jig 40, as shown in FIG. 31. The door side hinge leaf 12 is fitted into the recess 49 formed on the inner surface 43*i* of the base member 42. The door side hinge leaf 12 preferably only fits in one direction, with the hinge knuckles $13_1$, $13_2$ facing out.

Then, while the replacement door slab 2 is held down on the strike side 8*s*, the door hinge jig 40 with the door side hinge leaf 12 is placed into position over the hinge side $8_H$ of the replacement door slab 2 on the top end of the replacement door slab 2, so that the base surface 68 of the U-shaped flange portion 67 of the J-hook 64 engages the top side $8_T$ of the replacement door slab 2, as shown in FIG. 32. The locked door hinge jig 40 with the door side hinge leaf 12 is located by lining up the J-hook 64 with the top side $8_T$ of the new door slab 2. Once the J-hook 64 and the top side $8_T$ of the replacement door slab 2 are aligned, the door hinge jig 40 is fitted over the top side $8_T$ of the replacement door slab 2. Then fine height adjustments may be made by carefully sliding the door hinge jig 40 until the J-hook 64 is fully seated flat against the top side $8_T$ of the new door slab 2, as shown in FIGS. 33A and 33B.

Figure 33A:
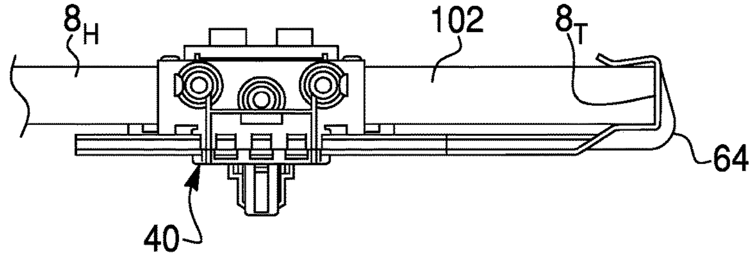
FIG. 33A is a top view of the door hinge jig placed on the hinge side of the replacement door slab.
Figure 33B:
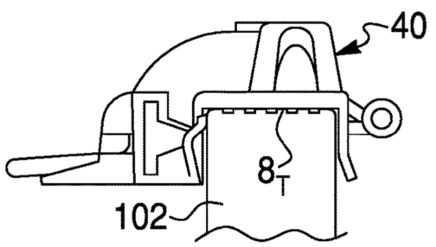
FIG. 33B is a side view of the door hinge jig placed on the hinge side of the replacement door slab.
Figure 34:
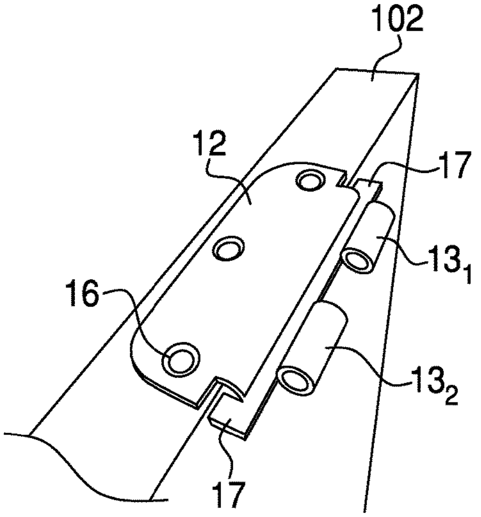
FIG. 34 shows an engaging edge of hinge tabs of the door side hinge leaf engaging a rear side of the replacement door slab.
Figure 35:
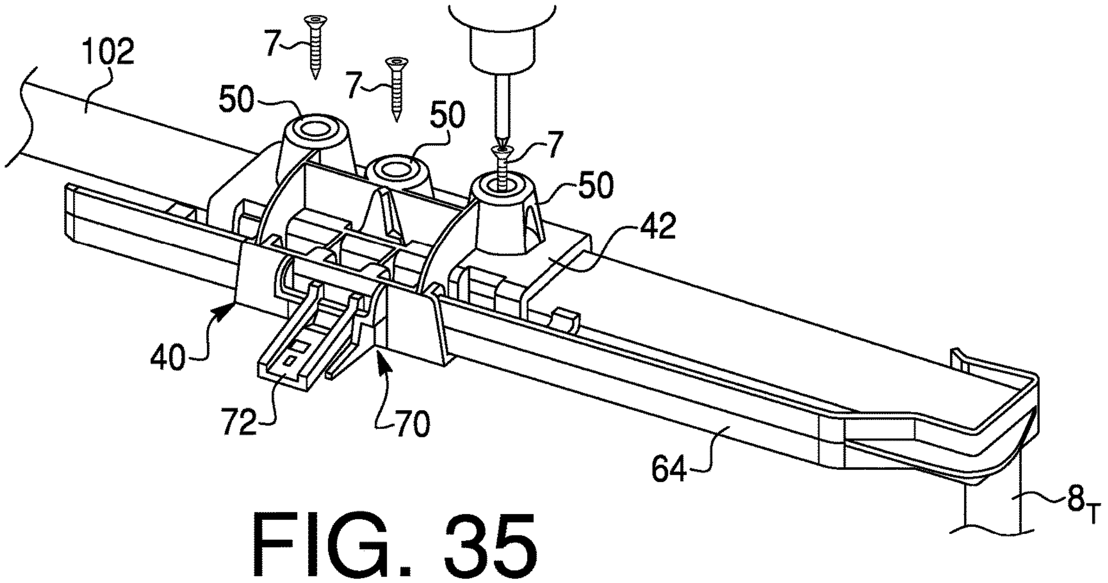
FIG. 35 shows the step of guiding and securing the hinge securing screws through the door hinge jig into the hinge side of the replacement door slab.

In this position, the door hinge jig 40 holds the door side hinge leaf 12 of the top door hinge 10 securely on the hinge side $8_H$ of the replacement door slab 2, and positions it accurately for proper door slab fit and operation within the door frame 4, as best shown in FIGS. 33A and 33B. In this position, the engaging edge 17*k* of the hinge tabs 17 of the door side hinge leaf 12 engages a rear side (or surface) $9_R$ of the new/replacement door slab 2, as best shown in FIG. 34. Next, the door hinge jig 40 is pre-loaded with self-drilling hinge securing screws 7 by placing the hinge securing screws 7 into the protruding screw posts 50, so that the resilient fingers 54 of each of the screw holes 52 holds one of the hinge securing screws 7 for supporting and guiding the hinge securing screws 7 through the door hinge jig 40 until it is embedded into the hinge side $8_H$ of the new door slab 2, as best shown in FIG. 35. The user (i.e., the door installer) can view through the windows in the door hinge jig 40 that the door side hinge leaf 12 of the top or upper door hinge 10 is seated securely in the recess 49 and is accurately positioned on the hinge side $8_H$ of the replacement door slab 2. After assuring that the door side hinge leaf 12 is positioned correctly, the door side hinge leaf 12 is fixedly fastened by screwing the hinge securing screws 7 to the hinge side $8_H$ of the new door slab 2 using a power drill/driver to drive the screws 7 until secure, as best shown in FIG. 35. Finally, the J-hook 64 is unlocked by the locking lever 72 and slid out of the door hinge jig 40, and the door hinge jig 40 is removed from the replacement door slab 2.

Alternatively, if the door hinge jig 40 does not have the J-hook 64, the previously measured distance from the top side $8_T$ of the existing door slab to a top edge of the existing door hinge is transferred to the new door slab 2 from the top side $8_T$ of the new door slab 2, and marked. Then, the top door hinge leaf 12 is aligned with the marked line, and an outline of the top door hinge leaf 12 is traced with a pencil or other marking instrument on the hinge side $8_H$ of the replacement door slab 2. If the two halves of the top hinge are still together, they are separated. Then, the top door hinge leaf 12 is placed snugly into the recess 49 of the door hinge jig 40. Next, the door hinge jig 40 is clipped to the door edge and aligned with the top of the hinge to the line marked on the door in the previous step by sighting through the windows of the door hinge jig 40. The self-drilling hinge securing screws are inserted into the screw posts 50 of the door hinge jig 40, and the door side hinge leaf 12 is fastened to the new door slab 2 by driving all three screws. After that, the door hinge jig 40 is removed from the new door slab.

Figure 36:
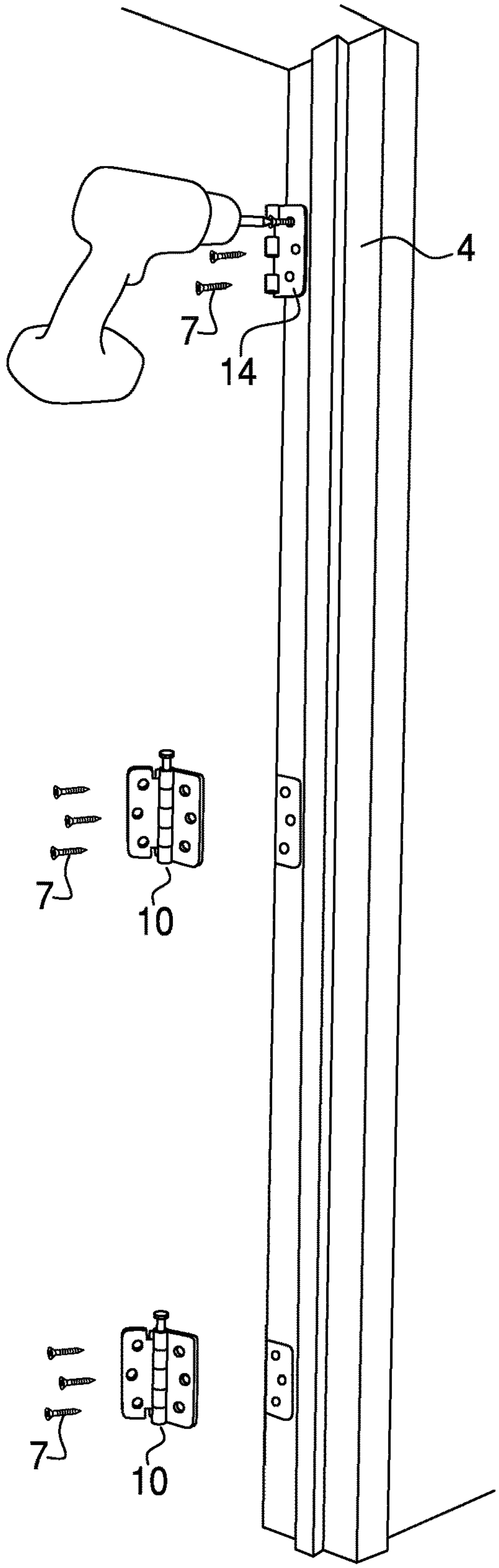
FIG. 36 shows the step of securing the door hinges to a door frame.

Next, the frame hinge leaf 14 is loosely attached to the door frame 4 by inserting the frame hinge leaf 14 into the same mortise the existing/original hinge was in (i.e., into the same location as the previous top hinge 110). Using the same screw holes as the existing/original door hinge 110, the new frame hinge leaf 14 is loosely fastened with 3 of the included self-drilling hinge screws 7. Then, the middle and bottom easy install door hinges 10 are loosely fastened to the door frame 4. Loose attachment will allow shims to be inserted, if necessary, in later steps. Preferably, for the middle and bottom hinges a complete hinge 10 is used (not separated into halves and leaving the pins in place), as shown in FIG. 36. Starting with the middle new door hinge, the frame hinge leaf 14 of the hinge 10 is inserted into the same mortise as the existing/original hinge 110, then three new included self-drilling hinge screws 7 are used to fasten it in place using the existing holes as the existing/original hinge. The same step is repeated for the bottom new door hinge 10. Once the middle and bottom hinges are attached, both the middle and bottom hinges are closed together. The new door hinges 10 are universal and may work on either side of the door frame 4.

Figure 38A:
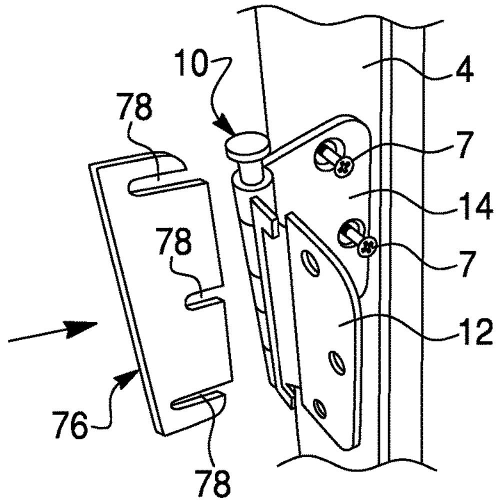
FIG. 38A is an enlarged view of the step of inserting the shim between one of the door hinges and the door frame.
Figure 38B:
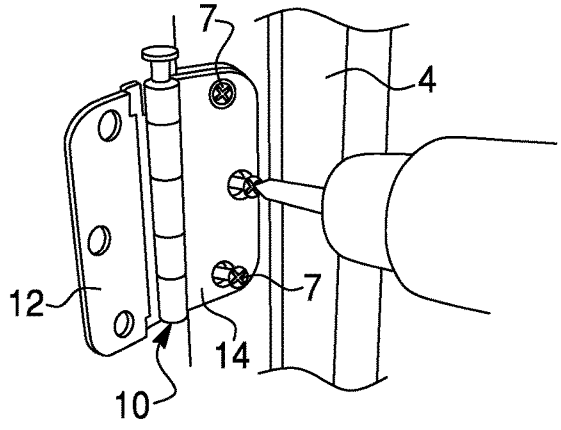
FIG. 38B shows the step of securing the frame hinge leaf and the shim to the door frame.
Figure 37:
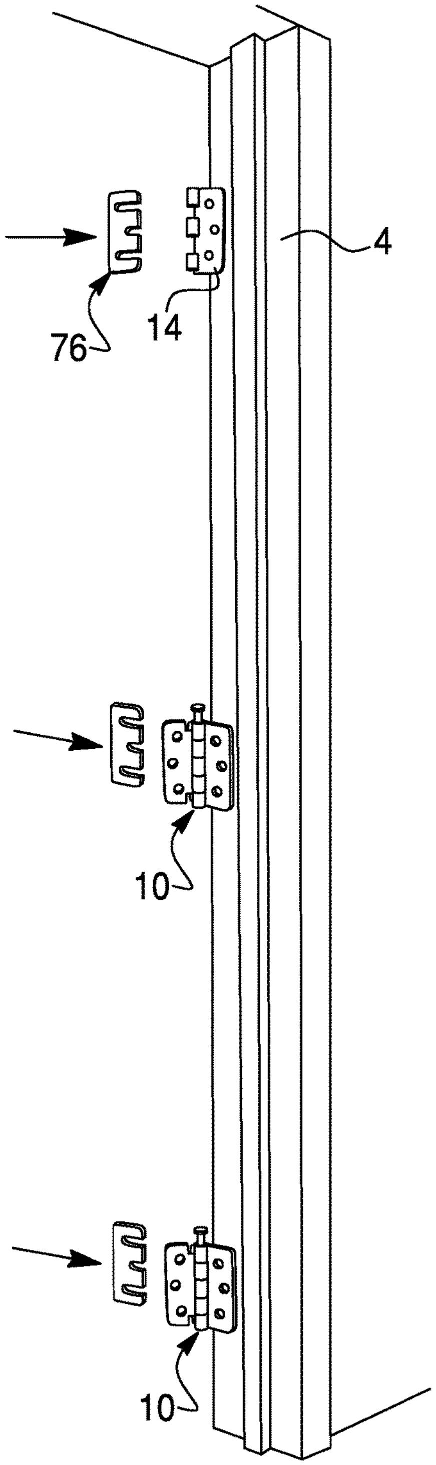
FIG. 37 shows the step of inserting shims between the door hinges and the door frame.

If necessary, a shim 76 may then be inserted between each hinge 10 and the frame 4, as best shown in FIG. 37. The shim 76 preferably has three slots 78 to slide in between the screws 7, as best shown in FIG. 38A. With the shims 76 in place, the installer tightens each of the hinge screws 7 until they are flush to the surface of the hinge 10, as best shown in FIG. 38B.

During installation of the replacement door slab 2, first, the assembled door mounting support 20 with captured door gap Sf from the previous (old) door slab is placed on the floor 5 in line relative to one another and ready to support the replacement door slab, as shown in FIGS. 4 and 13.

Figure 39:
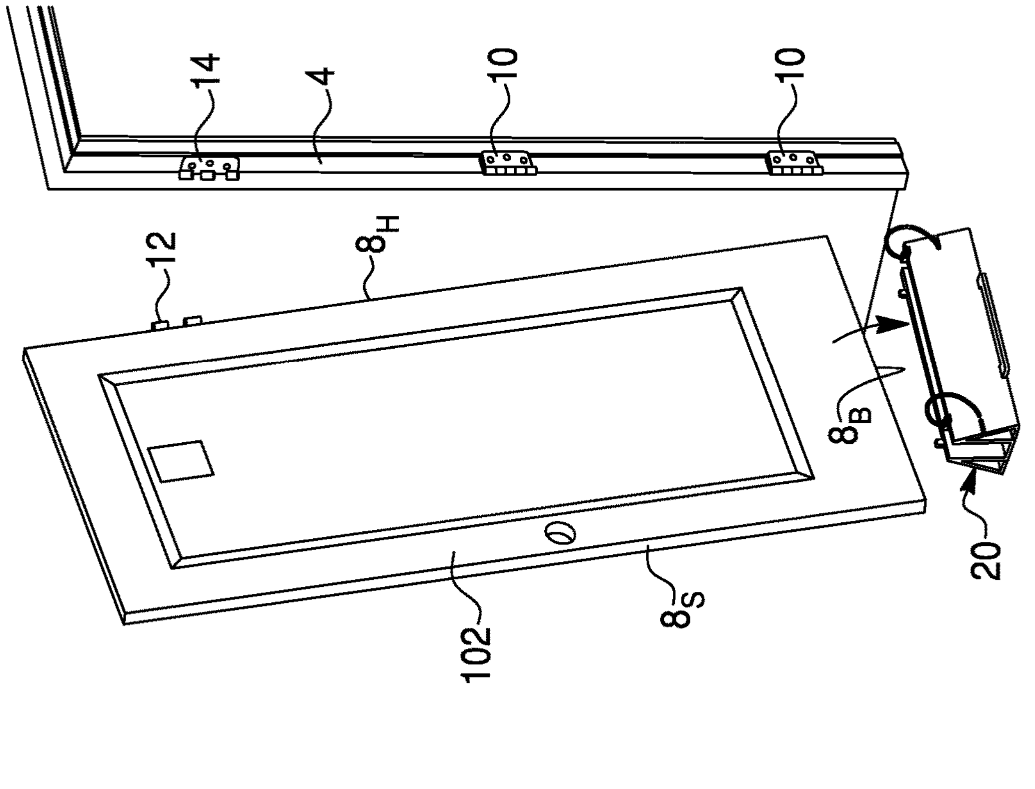
FIG. 39 shows the step of placing the replacement door slab onto door mounting support.

The middle and lower hinge halves 14 of the middle and lower hinges 10 are closed together. Then, the replacement door slab 2 is lifted and placed upright (or at 90° angle to the door frame 4) onto door mounting support 20, as shown in FIG. 39, thus positioning the replacement door slab 2 at the same distance Sf from the floor 5 as the previous (old) door slab to facilitate installation of the replacement door slab 2 to the door frame 4. The bottom edge $\mathbf{8}_B$ of the door slab 2 is preferably centered within the door mounting support 20. Next, the position of the new door slab 2 is adjusted to be in the "open" position relative to the door frame 4. Also, the position of the new door slab 2 is adjusted so that the top door hinge leaf 12 on the new door slab 2 is aligned with the top frame hinge leaf 14 on the door frame 4.

Figure 40:
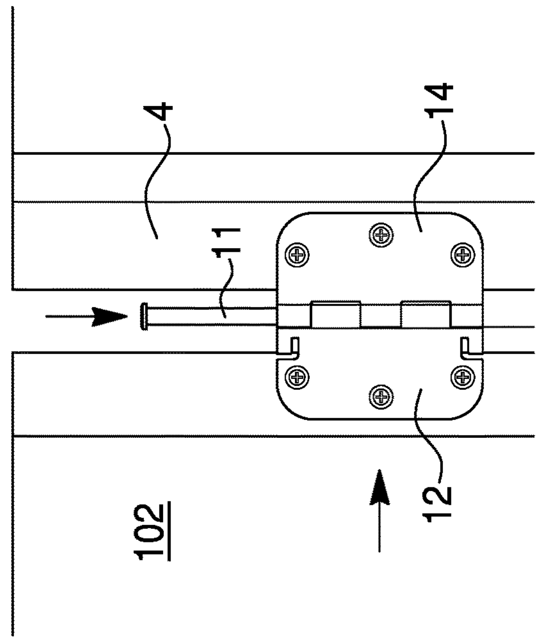
FIG. 40 shows the step of assembling the door hinge.

After that, the replacement door slab 2 is slid toward the frame 4 so that the top hinge halves 12, 14 interlock and the top hinge knuckles $\mathbf{13}_1$, $\mathbf{13}_2$ and $\mathbf{15}_1$, $\mathbf{15}_2$, $\mathbf{15}_3$ are meshed, and the hinge pin 11 is slidably received therein, as best shown in FIG. 40. If hinge halves 12, 14 are misaligned, small adjustments to the cable ties 15 of the door mounting support 20 can help correct the height. Final adjustments are made to the new door slab 2 to mesh the hinge knuckles $\mathbf{13}_1$, $\mathbf{13}_2$ of the door hinge leaf 12 in the hinge knuckles $\mathbf{15}_1$, $\mathbf{15}_2$, $\mathbf{15}_3$ of the frame hinge leaf 14. Once they are aligned, the hinge pin 11 is dropped through the top hinge knuckles $\mathbf{13}_1$, $\mathbf{13}_2$ and $\mathbf{15}_1$, $\mathbf{15}_2$, $\mathbf{15}_3$ to lock the hinges 12, 14 together, as best shown in FIG. 40.

Figure 41:
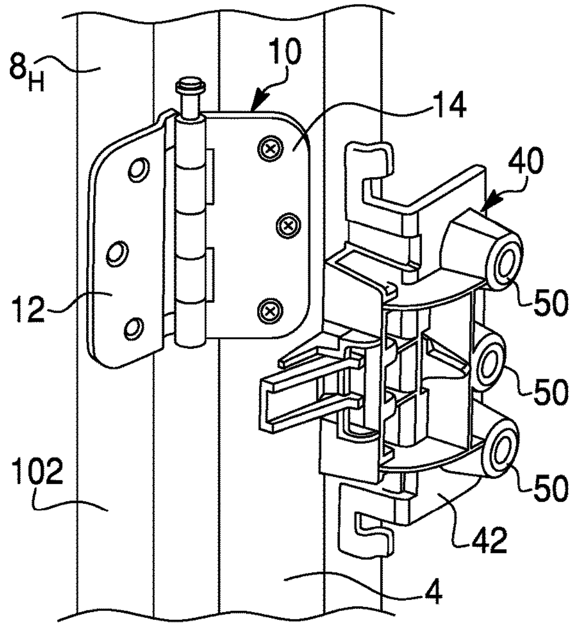
FIG. 41 shows the door hinge jig without the J-hook, which is unlocked and removed from the hinge block.
Figure 42:
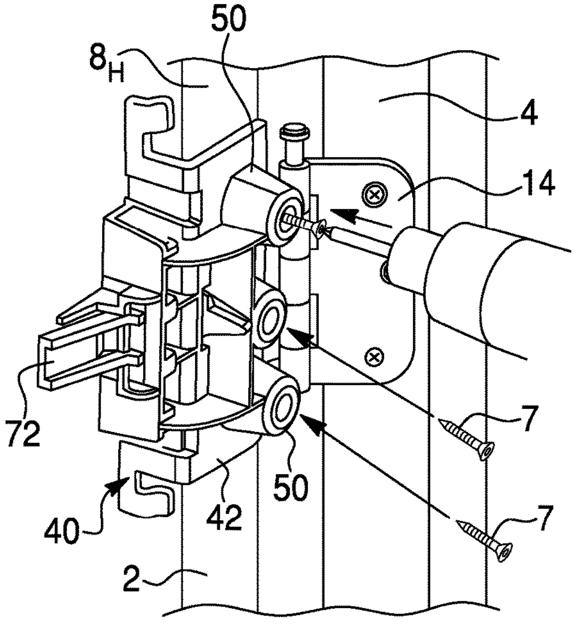
FIG. 42 shows screws being inserted into screw posts of the hinge block and driven into the replacement door slab.

Then, the middle and bottom hinges are fastened to the new door slab 2. Starting with the middle hinge, the door hinge leaf 12 is swung open so as to be against the hinge side $\mathbf{8}_H$ of the door 2. The door 2 is aligned so that the engaging edge 17*k* of the hinge tabs 17 on the door hinge 10 touch the face of the door 2. Also, a hinge face is fully flush against the hinge side $\mathbf{8}_H$ of the door 2. Next, the J-hook 64 is unlocked and removed from the hinge block 41, as best shown in FIG. 41. Then, the hinge block 41 (without the J-hook 64) is positioned over the middle door hinge leaf 12 and fitted over the new door slab 2. A check is made to assure everything is aligned and, if so, new screws 7 are inserted into the screw posts 50 of the hinge block 41 and the screws 7 are driven into the new door slab 2, as best shown in FIG. 42. The hinge block 41 is removed after making sure the screw heads are flush or a little below the face of the hinge 10. This process is repeated for the bottom hinge 10.

Figure 43:
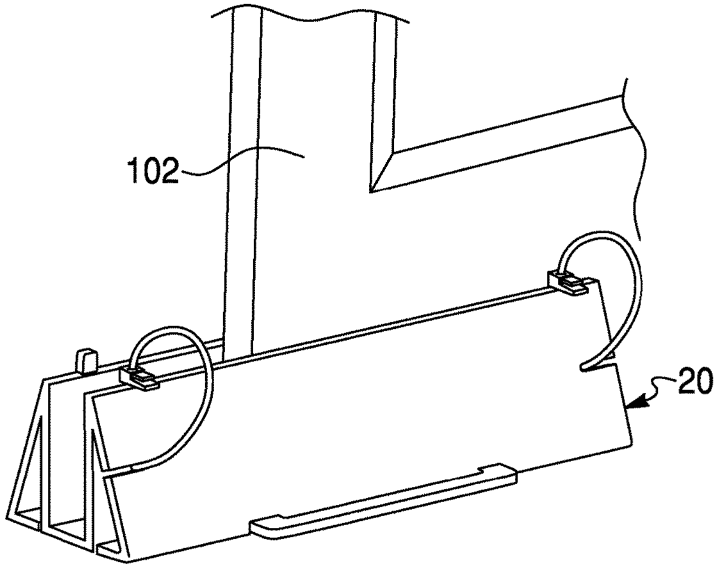
FIG. 43 shows the step of removing the door mounting support from under the replacement door slab.

When the installation of all of the new door hinges 10 is completed, the door mounting support 20 is removed from under the replacement door slab 2 by sliding it/them out along the bottom edge $\mathbf{8}_B$ of the new door slab 2, as best shown in FIG. 43. Loosening the cable ties 25 can reduce strain during removal of the door mounting support 20.

Finally, the handle hardware is installed on the new door 2, the latch barrel is inserted into a latch bore of the new door slab 2. Once the latch barrel is in place, the handles are installed.

Thus, the process for installing a replacement door according to the present invention comprises the following steps:

1) Supporting the door slab and capture door height off the floor including:
   a. installing the adaptable door mounting support to capture height of the door slab off the floor, and
   b. removing the old door slab;
2) Capturing location of top hinge from existing/original door with a door hinge jig, preferably with the door slab removed, but may be done prior to door removal;
3) Attaching the top hinge to a new (replacement) door slab including:
   a. separating the new top hinge halves, and
   b. transferring the top hinge height to the new door slab;
4) Attaching new hinges to a door frame including:
   a. loosely attaching new top hinge to the door frame,
   b. loosely attaching new middle and bottom hinges to the door frame,
   c. inserting hinge shims between at least one, preferably each, of the new hinges and the door frame, and
   d. Tightening hinges to the door frame;
5) Hanging new door on the installed new top hinge including:
   a. standing the new door in the door mounting support, and
   b. assembling the new top hinge and connecting hinge leaves by a hinge pin;
6) Attaching the new middle and bottom hinges to the replacement door;
7) Removing the door mounting support; and
8) Testing the new door for fit and alignment and making adjustments if necessary.

Therefore, the process for installing a replacement door of the present invention is more accessible and easier relative to the current "state of the art", and which allows someone with low DIY skills to replace a door slab (as opposed to the door slab and door frame) with a minimum number of tools accurately and quickly. Moreover, the process for installing a replacement door of the present invention makes the installation considerably easier by:

a. Providing a tool that enables simple, non-numerical but accurate measurements, and in some cases eliminates the need to measure altogether;
b. Enabling accurate hinge placements without need for a tape measure;
c. Eliminating the need to machine new hinge mortises on the door;
d. Eliminating the need to machine the handle and latch bore;
e. Providing simple installation steps that guide the user through each step of the process, preferably reinforced by pictures and video.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A system for installing a door slab in a door frame, the door slab adapted to be pivotally mounted to the door frame by door hinges, the system comprising an adaptable door mounting support configured to acquire a door gap defined as a distance between a bottom edge of the door slab pivotally mounted to the door frame through the door hinges and ground and to support the door slab at a height off the ground equal to the door gap;

the door mounting support including a frame member and at least one tie device, the at least one tie device adapted to meter the door gap and hold the door slab in place at the height off the ground equal to the door gap;

the frame member including first and second A-shaped segments interconnected by a bottom section and together defining a door support channel therebetween adapted to receive a portion of the door slab therein;

the at least one tie device including a cable tie extending across the door support channel and a locking tab attached to the cable tie by sliding the locking tab over the cable tie; and the locking tab lockable on the cable tie to adjust the distance between the cable tie and the bottom section of the frame member.

2. The system as defined in claim 1, further comprises a door hinge jig configured to acquire a location of the at least one of the door hinges on a hinge side of the door slab, wherein the door hinge jig comprises a hinge block and J-hook slidably mounted to the hinge block, wherein the hinge block comprises a base member and at least two screw posts protruding outwardly away from the base member and providing a guide for locating hinge screws, and wherein the J-hook has a straight slide portion slidably extending through the base member and a U-shaped flange portion defining a door support channel complementary to and engageable with a top side of the door slab.

3. The system as defined in claim 1, wherein:

the cable tie extends through the locking tab, and the locking tab is lockable on the cable tie to set an adjustment of the distance between the cable tie and the bottom section of the frame member.

4. A process for installing a replacement door slab in a door frame by door hinges instead of an existing door slab, the process comprising the steps of:

providing a door mounting support including a frame member and at least one tie device, the frame member including first and second A-shaped segments interconnected by a bottom section and together defining a door support channel therebetween adapted to receive a portion of the door slab therein, the at least tie device including a cable tie extending across the door support channel and a locking tab attached to the cable tie by sliding the locking tab over the cable tie;

positioning the door mounting support under a bottom edge of the existing door slab hung on the door frame so that the bottom edge of the existing door slab is disposed in the door support channel of the door mounting support above the cable tie of the at least tie device;

acquiring a door gap defined as a distance between the bottom edge of the existing door slab and a floor by pulling the cable tie so that a portion of cable tie is raised to touch the bottom edge of the existing door slab;

locking the cable tie in place by pushing the locking tab down toward one of the A-shaped segments;

removing the existing door slab from the door frame and from the door mounting support;

placing the replacement door slab on the cable tie in the door support channel of the door mounting support; and securing the replacement door slab to the door frame by the door hinges.

* * * * *